United States Patent
Machado et al.

(10) Patent No.: US 12,514,868 B2
(45) Date of Patent: Jan. 6, 2026

(54) MULTIPLEX shRNA FOR USE IN VECTORS

(71) Applicant: Dharmacon, Inc., Lafayette, CO (US)

(72) Inventors: Hidevaldo Bueno Machado, Arvada, CO (US); Eldon Thomas Chou, Thorton, CO (US)

(73) Assignee: DHARMACON, INC., Lafayette, CO (US)

( * ) Notice: Subject to any disclaimer, the term of this patent is extended or adjusted under 35 U.S.C. 154(b) by 1115 days.

(21) Appl. No.: 17/602,244

(22) PCT Filed: Apr. 24, 2020

(86) PCT No.: PCT/US2020/029692
§ 371 (c)(1),
(2) Date: Oct. 7, 2021

(87) PCT Pub. No.: WO2020/223118
PCT Pub. Date: Nov. 5, 2020

(65) Prior Publication Data
US 2022/0168332 A1 Jun. 2, 2022

Related U.S. Application Data

(60) Provisional application No. 62/842,049, filed on May 2, 2019.

(51) Int. Cl.
*A61K 31/7105* (2006.01)
*A61K 35/17* (2025.01)
(Continued)

(52) U.S. Cl.
CPC .......... *A61K 31/7105* (2013.01); *A61K 35/17* (2013.01); *C12N 7/00* (2013.01); *C12N 15/86* (2013.01); *C12N 2750/14141* (2013.01)

(58) Field of Classification Search
CPC .......... C12N 2310/14; C12N 2310/141; C12N 15/113; C12N 2501/65; C12N 2310/51
See application file for complete search history.

(56) References Cited

U.S. PATENT DOCUMENTS 8,841,267 B2  9/2014  Kelley et al.
9,284,554 B2  3/2016  Kelley et al.
(Continued)

FOREIGN PATENT DOCUMENTS

JP  2008-237023 A  10/2008
WO  2007/010840 A1  1/2007
(Continued)

OTHER PUBLICATIONS

Du, X., Cai, Y., Xi, W., Zhang, R., Jia, L., Yang, A., Zhao, J., & Yan, B. (2018). Multi-target inhibition by four tandem shRNAs embedded in homo- or hetero-miRNA backbones. Molecular medicine reports, 17(1), 307-314. https://doi.org/10.3892/mmr.2017.7854 (Year: 2017).*

(Continued)

*Primary Examiner* — Ram R Shukla
*Assistant Examiner* — Africa M Mcleod
(74) *Attorney, Agent, or Firm* — Dorf Nelson & Zauderer LLP; Scott D. Locke

(57) ABSTRACT

New polynucleotides and new expression vectors for multiplexed microRNA-based shRNAs are provided. The shRNAs generated from these polynucleotides and vectors can knock down the expression of multiple genes with minimum undesirable levels of off-target effects.

20 Claims, 10 Drawing Sheets
Specification includes a Sequence Listing.

(51) Int. Cl.
C12N 7/00 (2006.01)
C12N 15/86 (2006.01)

(56) References Cited

U.S. PATENT DOCUMENTS

| | | | |
|---|---|---|---|
| 9,353,368 B2* | 5/2016 | Kelley | C12Q 1/6869 |
| 9,951,331 B2 | 4/2018 | Krichevsky | |
| 10,968,451 B2 | 4/2021 | Wu et al. | |
| 2002/0086006 A1 | 7/2002 | Bandman et al. | |
| 2010/0292310 A1 | 11/2010 | Kelly et al. | |
| 2012/0076823 A1 | 3/2012 | Nair et al. | |
| 2013/0179999 A1 | 7/2013 | Hannon et al. | |
| 2014/0066595 A1 | 3/2014 | Anderson et al. | |
| 2014/0343130 A1 | 11/2014 | Kelley et al. | |
| 2017/0240899 A1* | 8/2017 | Wu | C12N 15/1138 |
| 2017/0356010 A1 | 12/2017 | Frost et al. | |

FOREIGN PATENT DOCUMENTS

| | | |
|---|---|---|
| WO | 2008/147837 A1 | 12/2008 |
| WO | 2012/159120 A2 | 11/2012 |
| WO | 2014-117050 A2 | 7/2014 |
| WO | 2016/061232 A2 | 4/2016 |
| WO | 2018/049471 A1 | 3/2018 |
| WO | 2018/170335 A1 | 9/2018 |
| WO | 2020/221873 A1 | 11/2020 |
| WO | 2020/221939 A1 | 11/2020 |
| WO | 2020/223118 A1 | 11/2020 |
| WO | 2020/254528 A1 | 12/2020 |

OTHER PUBLICATIONS

Gelfand, Y., & Kaplitt, M. G. (2013). Gene therapy for psychiatric disorders. World neurosurgery, 80(3-4), S32-e11. (Year: 2013).*

Asha, K., Kumar, P., Sanicas, M., Meseko, C. A., Khanna, M., & Kumar, B. (2019). Advancements in Nucleic Acid Based Therapeutics against Respiratory Viral Infections. Journal of Clinical Medicine, 8(1), 6. https://doi.org/10.3390/jcm8010006 (Year: 2019).*

European extended search report, European Patent Office, Application Serial No. 20799114.2 (Sep. 29, 2023).

Li, Jian-Feng et al., Engineering Artificial MicroRNAs for Multiplex Gene Silencing and Simplified Transgenic Screen, Plant Physiology Preview, Oct. 5, 2018, DOI:10.1104/pp. 18.00828.

Eije, K.J. Von et al., Engineering and optimization of the miR-106b cluster for ectopic expression of multiplexed anti-HIV RNAs, Gene Therapy, Jan. 2009.

Wang, Tingting et al., Construction and Characterization of a Synthetic MicroRNA Cluster for Multiplex RNA Interference in Mammalian Cells, ACS Synthetic Biology, 2016, 5, pp. 1193-1200, DOI: 10.1021/acssynbio.5b00180.

Choi, Jang-Gi, et al., Multiplexing Seven miRNA-Based shRNAs to Suppress HIV Replication, The American Society of Gene & Cell Therapy, www.moleculartherapy.org, vol. 23 No. 2, 310-320, Feb. 2015.

Fowler, Daniel K. et al., Improved knockdown from artificial microRNAs in an enhanced miR-155 backbone: a designer's guide to potent multi-target RNAi, Nucleic Acids Research, 2016, vol. 44, No. 5 , e48, doi: 10.1093/nar/gkv1246.

Hu, Tao et al., Construction of an Artificial MicroRNA Expression Vector for Simultaneous Inhibition of Multiple Genes in Mammalian Cells, Int. J. Mol. Sci. 2009, 10, 2158-2168; doi:10.3390/ijms10052158.

WIPO, International Searching Authority, International Search Report, Application No. PCT/US 20/29692, Oct. 5, 2020.

Knoepfel, Stefanie A. et al., Selection of RNAi-based inhibitors for anti-HIV gene therapy, World J Virol, Jun. 12, 2012, 1(3): 79-90 ISSN 2220-3249 (online), doi:10.5501/wjv.v1.i3.79.

Leng, Qiuping et al., RNA-based scaffolds for bone regeneration: application and mechanisms of mRNA, miRNA and siRNA, Theranostics 2020, 10(7): 3190-3205. doi: 10.7150/thno.42640.

WIPO, Written Opinion, PCT/US20/29692, Oct. 5, 2020.

Hudry, E. et al., Exosome-associated AAV vector as a robust and convenient neuroscience tool, Gene Therapy 23, 380-392 (2016).

Pfaffl MW. 2001. A new mathematical model for relative quantification in real-time RT-PCR, Nucl. Acids Res., 29:e45.

Xu-Gang Xia et al., Multiple shRNAs expressed by an inducible pol II promoter can knock down the expression of multiple target genes, BioTechniques 41:64-68 (Jul. 2006), doi 10.2144/000112198.

Daqian Sun et al., Multi-miRNA hairpin method that improves gene knockdown efficiency and provides linked multi-gene knockdown, BioTechniques 41:59-63 (Jul. 2006), doi 10.2144/000112203.

Annaleen Vermeulen et al., Development of the Dharmacon™ SMARTvector™ Lentiviral shRNA microRNA-adapted scaffold and algorithm for functional shRNAs, Horizon Inspired Cell Solutions, V3-1018.

Michael K. Riley II et al., Recent Advances in Nanomaterials for Gene Delivery—A Review, Nanomaterials 2017, 7, 94, doi:10.3390/nano7050094.

Glen J Mcintyre et al., A comparison of multiple shRNA expression methods for combinatorial RNAi, Genetic Vaccines and Therapy 2011, 9:9 http://www.gvt-journal.com/content/9/1/9.

Glen J Mcintyre et al., Multiple shRNA combinations for near-complete coverage of all HIV-1 strains, AIDS Research and Therapy 2011, 8: 1 http://www.aidsrestherapy.com/content/8/1/1.

Ying Poi Liu et al., Inhibition of HIV-1 by multiple siRNAs expressed from a single microRNA polycistron, Nucleic Acids Research, 2008, vol. 36, No. 9 2811-2824, doi:10.1093/nar/gkn109.

Fellmann, Christof, et al., An Optimized microRNABackbone for Effective Single-Copy RNAi, Cell Reports 5, 1704-1713, Dec. 26, 2013.

Fellmann, Christof, et al., An Optimized microRNABackbone for Effective Single-Copy RNAi, Supplemental Information, 25 pages.

* cited by examiner

SEQUENCE LISTING

```
<160> NUMBER OF SEQ ID NOS: 45

<210> SEQ ID NO 1
<211> LENGTH: 60
<212> TYPE: DNA
<213> ORGANISM: Artificial Sequence
<220> FEATURE:
<223> OTHER INFORMATION: Synthetic

<400> SEQUENCE: 1
gaatccaact tacttcttca cgacaacact tacctttgtg caagcactta tgatcctgat      60

<210> SEQ ID NO 2
<211> LENGTH: 52
<212> TYPE: DNA
<213> ORGANISM: Artificial Sequence
<220> FEATURE:
<223> OTHER INFORMATION: Synthetic

<400> SEQUENCE: 2
gagtccaatt tacttcttca cacattcctg tatttgcaag cacttgtcct ga              52

<210> SEQ ID NO 3
<211> LENGTH: 60
<212> TYPE: DNA
<213> ORGANISM: Artificial Sequence
<220> FEATURE:
<223> OTHER INFORMATION: Synthetic

<400> SEQUENCE: 3
gctctttact cctcgcctat tgagaccttt aggatgcgga aactgcttta cttaacatct      60

<210> SEQ ID NO 4
<211> LENGTH: 52
<212> TYPE: DNA
<213> ORGANISM: Artificial Sequence
<220> FEATURE:
<223> OTHER INFORMATION: Synthetic

<400> SEQUENCE: 4
tgttggatgt ggacacttct ttactaatac cttgttaact ggtcttaata cg              52

<210> SEQ ID NO 5
<211> LENGTH: 45
<212> TYPE: DNA
<213> ORGANISM: Artificial Sequence
<220> FEATURE:
<223> OTHER INFORMATION: Synthetic
```

<400> SEQUENCE: 5
cttcgatacg atacagcggt atggtgcacc tcaaatcctg tggtc                    45

<210> SEQ ID NO 6
<211> LENGTH: 56
<212> TYPE: DNA
<213> ORGANISM: Artificial Sequence
<220> FEATURE:
<223> OTHER INFORMATION: Synthetic

<400> SEQUENCE: 6
tcgggcactt caattccgta gttatcttga accttcgtgg agcgacagat acatct        56

<210> SEQ ID NO 7
<211> LENGTH: 57
<212> TYPE: DNA
<213> ORGANISM: Artificial Sequence
<220> FEATURE:
<223> OTHER INFORMATION: Synthetic

<400> SEQUENCE: 7
tcctcgtaca tatagcatga ctagctttgt gacctttgac tttctctatc aatctat      57

<210> SEQ ID NO 8
<211> LENGTH: 51
<212> TYPE: DNA
<213> ORGANISM: Artificial Sequence
<220> FEATURE:
<223> OTHER INFORMATION: Synthetic

<400> SEQUENCE: 8
acatgaggat atcaggtagt ctgcaacact ctaagggcgg ttatctgtgg t             51

<210> SEQ ID NO 9
<211> LENGTH: 50
<212> TYPE: DNA
<213> ORGANISM: Artificial Sequence
<220> FEATURE:
<223> OTHER INFORMATION: Synthetic

<400> SEQUENCE: 9
atccaactta cgtatccaat atcggtcttg ctaatcatgt gtcctgttac               50

<210> SEQ ID NO 10
<211> LENGTH: 51
<212> TYPE: DNA
<213> ORGANISM: Artificial Sequence
<220> FEATURE:
<223> OTHER INFORMATION: Synthetic

<400> SEQUENCE: 10
ttcgatcgat acgatagcgg ggagttcgcg ttgttccgac gttgtacact t             51

<210> SEQ ID NO 11
<211> LENGTH: 48
<212> TYPE: DNA
<213> ORGANISM: Artificial Sequence
<220> FEATURE:
<223> OTHER INFORMATION: Synthetic

<400> SEQUENCE: 11
tgctaacgtc ggtgatcgcg cgaaatagtc tagggccgac cgggtcgc                 48

<210> SEQ ID NO 12

```
<211> LENGTH: 40
<212> TYPE: DNA
<213> ORGANISM: Artificial Sequence
<220> FEATURE:
<223> OTHER INFORMATION: Synthetic

<400> SEQUENCE: 12
tagagtacga gtcggcgaac agttacatcg aagtcgcgtc                           40

<210> SEQ ID NO 13
<211> LENGTH: 30
<212> TYPE: DNA
<213> ORGANISM: Artificial Sequence
<220> FEATURE:
<223> OTHER INFORMATION: Synthetic

<400> SEQUENCE: 13
tcaccacaac acattccttt attgtagcaa                                      30

<210> SEQ ID NO 14
<211> LENGTH: 30
<212> TYPE: DNA
<213> ORGANISM: Artificial Sequence
<220> FEATURE:
<223> OTHER INFORMATION: Synthetic

<400> SEQUENCE: 14
ctgagctatg ccacctggga tgccttcacg                                      30

<210> SEQ ID NO 15
<211> LENGTH: 30
<212> TYPE: DNA
<213> ORGANISM: Artificial Sequence
<220> FEATURE:
<223> OTHER INFORMATION: Synthetic

<400> SEQUENCE: 15
cctgttaact ggtcttaata cggtgtctcc                                      30

<210> SEQ ID NO 16
<211> LENGTH: 56
<212> TYPE: DNA
<213> ORGANISM: Artificial Sequence
<220> FEATURE:
<223> OTHER INFORMATION: Synthetic

<400> SEQUENCE: 16
tcgggcactt caattccgta gttatcttga accttcgtgg agcgacagat acatgc         56

<210> SEQ ID NO 17
<211> LENGTH: 150
<212> TYPE: DNA
<213> ORGANISM: Artificial Sequence
<220> FEATURE:
<223> OTHER INFORMATION: Synthetic

<400> SEQUENCE: 17
tcagacccct tacccaccca gcaacccaaa gtctactctc tagtccttag ggaggttgtg     60
ggggcggaaa gggggacggg gctgaatttc ttccttcccc aaccccttc ccttctcctc     120 cagatagatg caaagctgaa tctcccgccc                                     150

<210> SEQ ID NO 18
<211> LENGTH: 87
<212> TYPE: DNA
<213> ORGANISM: Artificial Sequence
```

<220> FEATURE:
<223> OTHER INFORMATION: Synthetic

<400> SEQUENCE: 18
gcggaaaggg ggacggggct gaatttcttc cttccccaac cccttccct tctcctccag    60 atagatgcaa agctgaatct cccgccc                                       87

<210> SEQ ID NO 19
<211> LENGTH: 37
<212> TYPE: DNA
<213> ORGANISM: Artificial Sequence
<220> FEATURE:
<223> OTHER INFORMATION: Synthetic

<400> SEQUENCE: 19
ccaatcgagc tctcccactc ctaccctccc cagtggg                             37

<210> SEQ ID NO 20
<211> LENGTH: 150
<212> TYPE: DNA
<213> ORGANISM: Artificial Sequence
<220> FEATURE:
<223> OTHER INFORMATION: Synthetic

<400> SEQUENCE: 20
ccaatcgagc tctcccactc ctaccctccc cagtgggact gccccactgc cccctcccag    60
atagggcaaa gtgggtgcag accaaggagg acaagctgtg agtggggttg cagaacaagt   120
ctggagaacc ctgctttatg ccgtcctcta                                    150

<210> SEQ ID NO 21
<211> LENGTH: 81
<212> TYPE: DNA
<213> ORGANISM: Artificial Sequence
<220> FEATURE:
<223> OTHER INFORMATION: Synthetic

<400> SEQUENCE: 21
ccaatcgagc tctcccactc ctaccctccc cagtgggact gccccactgc cccctcccag    60
atagggcaaa gtgggtgcag a                                              81

<210> SEQ ID NO 22
<211> LENGTH: 38
<212> TYPE: DNA
<213> ORGANISM: Artificial Sequence
<220> FEATURE:
<223> OTHER INFORMATION: Synthetic

<400> SEQUENCE: 22
ccaatcgagc tctcccactc ctaccctccc cagtggga                            38

<210> SEQ ID NO 23
<211> LENGTH: 57
<212> TYPE: DNA
<213> ORGANISM: Artificial Sequence
<220> FEATURE:
<223> OTHER INFORMATION: Synthetic

<400> SEQUENCE: 23
ttccgaagag accaaagatg ggattgagtt ttgaactcgt ctttgctctc tttggag       57

<210> SEQ ID NO 24
<211> LENGTH: 57
<212> TYPE: DNA

```
<213> ORGANISM: Artificial Sequence
<220> FEATURE:
<223> OTHER INFORMATION: Synthetic

<400> SEQUENCE: 24
tatcagccat gctaattcgg ggattgagtt ttgaactctg aattaccatg gctgatg      57

<210> SEQ ID NO 25
<211> LENGTH: 57
<212> TYPE: DNA
<213> ORGANISM: Artificial Sequence
<220> FEATURE:
<223> OTHER INFORMATION: Synthetic

<400> SEQUENCE: 25
tccccaaaga ggacatccgg ggattgagtt ttgaactccg gatgtgctct ttggggg      57

<210> SEQ ID NO 26
<211> LENGTH: 57
<212> TYPE: DNA
<213> ORGANISM: Artificial Sequence
<220> FEATURE:
<223> OTHER INFORMATION: Synthetic

<400> SEQUENCE: 26
ttaaattaaa acccgcaggg ggattgagtt ttgaactccc tgcggctttt aatttag      57

<210> SEQ ID NO 27
<211> LENGTH: 57
<212> TYPE: DNA
<213> ORGANISM: Artificial Sequence
<220> FEATURE:
<223> OTHER INFORMATION: Synthetic

<400> SEQUENCE: 27
tacttgacag ccttcaggtg ggattgagtt ttgaactcac ctgaacgctg tcaagtg      57

<210> SEQ ID NO 28
<211> LENGTH: 57
<212> TYPE: DNA
<213> ORGANISM: Artificial Sequence
<220> FEATURE:
<223> OTHER INFORMATION: Synthetic

<400> SEQUENCE: 28
ttcgaatcaa tccaacagtg ggattgagtt ttgaactcac tgttgcattg attcgag      57

<210> SEQ ID NO 29
<211> LENGTH: 57
<212> TYPE: DNA
<213> ORGANISM: Artificial Sequence
<220> FEATURE:
<223> OTHER INFORMATION: Synthetic

<400> SEQUENCE: 29
tatattctcc aggaaatgcg ggattgagtt ttgaactcgc atttcgtgga gaatatg      57

<210> SEQ ID NO 30
<211> LENGTH: 57
<212> TYPE: DNA
<213> ORGANISM: Artificial Sequence
<220> FEATURE:
<223> OTHER INFORMATION: Synthetic

<400> SEQUENCE: 30
taaaactcac actggttgcg ggattgagtt ttgaactcgc aaccactgtg agttttg      57
```

<210> SEQ ID NO 31
<211> LENGTH: 70
<212> TYPE: RNA
<213> ORGANISM: Artificial Sequence
<220> FEATURE:
<223> OTHER INFORMATION: Synthetic
<220> FEATURE:
<221> NAME/KEY: misc_feature
<222> LOCATION: (25)..()
<223> OTHER INFORMATION: n is a mature strand insert in an miRNA
      cassette
<220> FEATURE:
<221> NAME/KEY: misc_feature
<222> LOCATION: (25)..(25)
<223> OTHER INFORMATION: n is a, c, g, or u
<220> FEATURE:
<221> NAME/KEY: misc_feature
<222> LOCATION: (41)..(41)
<223> OTHER INFORMATION: n is a, c, g, or u
<220> FEATURE:
<221> NAME/KEY: misc_feature
<222> LOCATION: (51)..()
<223> OTHER INFORMATION: n is a mature strand insert in an miRNA
      cassette

<400> SEQUENCE: 31
ugcucgcuca gcugaucugu ggcungauug aguuugaac naguuacauc agucgguuuu     60
cgucgagggc                                                          70

<210> SEQ ID NO 32
<211> LENGTH: 106
<212> TYPE: RNA
<213> ORGANISM: Artificial Sequence
<220> FEATURE:
<223> OTHER INFORMATION: Synthetic
<220> FEATURE:
<221> NAME/KEY: misc_feature
<222> LOCATION: (25)..(43)
<223> OTHER INFORMATION: n is any of A, C, G, or U
<220> FEATURE:
<221> NAME/KEY: misc_feature
<222> LOCATION: (59)..(77)
<223> OTHER INFORMATION: n is any of A, C, G, or U

<400> SEQUENCE: 32
ugcucgcuca gcugaucugu ggcunnnnnn nnnnnnnnnn nnngauugag uuugaacnn     60 nnnnnnnnnn nnnnnnnagu uacaucaguc gguuucguc gagggc                  106

<210> SEQ ID NO 33
<211> LENGTH: 57
<212> TYPE: DNA
<213> ORGANISM: Artificial Sequence
<220> FEATURE:
<223> OTHER INFORMATION: Synthetic

<400> SEQUENCE: 33
tccaggttaa tgaaagccgg ggattgagtt ttgaactccg gctttgatta acctggg      57

<210> SEQ ID NO 34
<211> LENGTH: 57
<212> TYPE: DNA
<213> ORGANISM: Artificial Sequence
<220> FEATURE:
<223> OTHER INFORMATION: Synthetic

<400> SEQUENCE: 34
taaaccgaac ttctcctgag ggattgagtt ttgaactctc aggagtagtt cggtttg      57

<210> SEQ ID NO 35
<211> LENGTH: 57
<212> TYPE: DNA
<213> ORGANISM: Artificial Sequence
<220> FEATURE:
<223> OTHER INFORMATION: Synthetic

<400> SEQUENCE: 35
tcgacgatta actacttctg ggattgagtt ttgaactcag aagtacttaa tcgtcgg      57

<210> SEQ ID NO 36
<211> LENGTH: 57
<212> TYPE: DNA
<213> ORGANISM: Artificial Sequence
<220> FEATURE:
<223> OTHER INFORMATION: Synthetic

<400> SEQUENCE: 36
tatgggttca caaatcagcg ggattgagtt ttgaactcgt tgattagtga actcatg      57

<210> SEQ ID NO 37
<211> LENGTH: 72
<212> TYPE: DNA
<213> ORGANISM: Artificial Sequence
<220> FEATURE:
<223> OTHER INFORMATION: Synthetic

<400> SEQUENCE: 37
tgtcgggttc gaatcaatcc aacagttgac tgttgaatct catggcactg ttgcattgat      60
tcgagtctga ca      72

<210> SEQ ID NO 38
<211> LENGTH: 71
<212> TYPE: DNA
<213> ORGANISM: Artificial Sequence
<220> FEATURE:
<223> OTHER INFORMATION: Synthetic

<400> SEQUENCE: 38
gcgactatat tctccaggaa atgcaagctg tgaagccaca gatgggcgca tttcgtggag      60
aatatagctg c      71

<210> SEQ ID NO 39
<211> LENGTH: 65
<212> TYPE: DNA
<213> ORGANISM: Artificial Sequence
<220> FEATURE:
<223> OTHER INFORMATION: Synthetic

<400> SEQUENCE: 39
ctgtaaaact cacactggtt gcgggttttt gcctccaact gacgcaacca ctgtgagttt      60
tacag      65

<210> SEQ ID NO 40
<211> LENGTH: 65
<212> TYPE: DNA
<213> ORGANISM: Artificial Sequence
<220> FEATURE:
<223> OTHER INFORMATION: Synthetic

<400> SEQUENCE: 40
ctgttcgaat caatccaaca gtgggttttt gcctccaact gacactgttg cattgattcg      60
aacag      65

<210> SEQ ID NO 41
<211> LENGTH: 72
<212> TYPE: DNA
<213> ORGANISM: Artificial Sequence
<220> FEATURE:
<223> OTHER INFORMATION: Synthetic

<400> SEQUENCE: 41
tgtcgggtat attctccagg aaatgctgac tgttgaatct catggcgcat ttcgtggaga    60
atatgtctga ca                                                       72

<210> SEQ ID NO 42
<211> LENGTH: 71
<212> TYPE: DNA
<213> ORGANISM: Artificial Sequence
<220> FEATURE:
<223> OTHER INFORMATION: Synthetic

<400> SEQUENCE: 42
gcgactaaaa ctcacactgg ttgcaagctg tgaagccaca gatgggcgca accactgtga    60
gttttagctg c                                                        71

<210> SEQ ID NO 43
<211> LENGTH: 71
<212> TYPE: DNA
<213> ORGANISM: Artificial Sequence
<220> FEATURE:
<223> OTHER INFORMATION: Synthetic

<400> SEQUENCE: 43
gcgacttcga atcaatccaa cagtaagctg tgaagccaca gatgggcact gttgcattga    60
ttcgaagctg c                                                        71

<210> SEQ ID NO 44
<211> LENGTH: 72
<212> TYPE: DNA
<213> ORGANISM: Artificial Sequence
<220> FEATURE:
<223> OTHER INFORMATION: Synthetic

<400> SEQUENCE: 44
tgtcgggtaa aactcacact ggttgctgac tgttgaatct catggcgcaa ccactgtgag    60
ttttgtctga ca                                                       72

<210> SEQ ID NO 45
<211> LENGTH: 65
<212> TYPE: DNA
<213> ORGANISM: Artificial Sequence
<220> FEATURE:
<223> OTHER INFORMATION: Synthetic

<400> SEQUENCE: 45
ctgtatattc tccaggaaat gcgggttttt gcctccaact gacgcatttc gtggagaata    60
tacag                                                               65

MULTIPLEX shRNA FOR USE IN VECTORS

CROSS-REFERENCE TO RELATED APPLICATION

This application is a national stage application of PCT/US2020/029692, filed Apr. 24, 2020, which claims the benefit of the filing date of U.S. Provisional Application Ser. No. 62/842,049, filed May 2, 2019, the entire disclosures of which are incorporated by reference as if set forth fully herein.

SEQUENCE DISCLOSURE

This application includes as part of its disclosure an electronic sequence listing text file named "DHARMA_0103_WO_US_ST25.txt", having a size of 11 kilobytes and created on Oct. 7, 2021, which is hereby incorporated by reference in its entirety.

FIELD OF THE INVENTION

The present invention relates to the field of gene modulation.

BACKGROUND OF THE INVENTION

RNA interference ("RNAi") is involved in post-transcriptional gene modulation, and RNAi technologies have been described as constituting a key part of a global drug discovery market that will reach approximately $160 billion by 2025. One of the mechanisms of RNAi gene modulation in plants and animals is through the expression of small non-coding RNAs called microRNAs ("miRNAs"). miRNAs are able to target specific messenger RNAs ("mRNA") for degradation, and thereby promote gene silencing.

Because of the importance of the microRNA pathway in the modulation of gene activity, researchers are currently exploring the extent to which small interfering RNAs ("siRNAs"), which are artificially designed molecules, can mediate RNAi. siRNAs can cause cleavage of a target molecule, such as mRNA. Similar to miRNAs, in order to recognize a target molecule, siRNAs rely on the complementarity of bases.

Within the class of molecules that are known as siRNAs are short hairpin RNAs ("shRNAs"). shRNAs are single stranded molecules that contain a sense region and an antisense region that is capable of hybridizing with the sense region. shRNAs are capable of forming a stem and loop structure in which the sense region and the antisense region form part or all of the stem. One advantage of using shRNAs is that they can be delivered or transcribed as a single molecule, which is not possible when an siRNA has two separate strands. However, like other siRNAs, shRNAs target mRNA based on the complementarity of bases.

Many conditions, diseases, and disorders are caused by the interaction between or among a plurality of proteins. Consequently, researchers are searching for effective ways to deliver multiple siRNAs to a cell or an organism at the same time.

One delivery option is the use of vector technologies to express shRNAs in the cells in which they will be processed through the endogenous miRNA pathway. The use of separate vectors for each shRNA can be cumbersome and difficult to deliver simultaneously in cells. Consequently, researchers have begun to explore the use of vectors that are capable of expressing a plurality of shRNAs. Unfortunately, to date, researchers have not been able to develop sufficiently effective multiplex systems. Among the issues that researchers have described are: (a) a risk of vector recombination and loss of shRNA expression; (b) reduced shRNA functionality by positional effects in a multiplex cassette; (c) the complexity of shRNA cloning; (d) RNAi processing saturation; (e) cytotoxicity; and (f) undesirable off-target effects. See e.g., WO2016/061232 A2, Multiplexed shRNAs and Use Thereof, published Apr. 21, 2016.

Therefore, there remains a need to develop efficient cassettes and vectors for delivery of multiplexed microRNA-based shRNAs.

SUMMARY OF THE INVENTION

The present invention provides polynucleotides, vectors, and methods for delivering and/or expressing multiplexed microRNA-based shRNAs, as well as therapeutic cells that comprise or use the polynucleotides or vectors. Through the various embodiments of the present invention, persons of ordinary skill in the art can effectively and efficiently use and/or cause the expression of a plurality of shRNAs.

According to a first embodiment, the present invention is directed to a polynucleotide comprising a multiplexed microRNA-based shRNA encoding region, wherein said multiplexed microRNA-based shRNA encoding region comprises a sequence that encodes two or more artificial miRNA-based shRNA nucleotide sequences, wherein each artificial miRNA-based shRNA nucleotide sequence comprises: (A) a miRNA scaffold sequence, wherein the miRNA scaffold is a miR-196a-2 scaffold sequence or a sequence that is at least 80% identical to a miR-196a-2 scaffold sequence or a truncated miR-196a-2 scaffold sequence, wherein the truncated miR-196a-2 scaffold sequence has a deletion of 1-6 of the nucleotide on either or both of its 5' end and 3'end; (B) an active sequence, wherein the active sequence of each of the artificial miRNA-based shRNA nucleotide sequences is 18-40 nucleotides long; and (C) a passenger sequence, wherein within each artificial miRNA-based shRNA nucleotide sequence, the active sequence is at least 80% complementary to the passenger sequence and each passenger sequence is 18-40 nucleotides long. Each active sequence may be different or two or more, if not all of them may be the same. As compared to other scaffolds, the miR-196a-2 scaffold is unexpectedly more efficient for multiplex applications.

According to a second embodiment, the present invention provides a polynucleotide comprising a multiplexed microRNA-based shRNA encoding region, wherein said multiplexed microRNA-based shRNA encoding region comprises sequences that code for: (A) X artificial miRNA-based shRNA nucleotide sequences, wherein each artificial miRNA-based shRNA nucleotide sequence comprises (i) a miRNA scaffold sequence such as SEQ ID NO: 31 or a sequence that is at least 80% identical to SEQ ID NO: 31 or is a truncated version of SEQ ID NO: 31 at one or both of the 5' end and 3' end, (ii) an active sequence, wherein the active sequence of each of the artificial miRNA-based shRNA nucleotide sequences is 18-40 nucleotides long, and (iii) a passenger sequence, wherein within each artificial miRNA-based shRNA nucleotide sequence, the active sequence is at least 80% complementary to the passenger sequence and each passenger sequence is 18-40 nucleotides long; and (B) Y linker sequences, wherein each linker sequence is not identical to an endogenous sequence within the genome of a target organism, wherein X is greater than or equal to 2, and Y=X−1, wherein each linker sequence is located between a pair of consecutive artificial miRNA-based shRNA nucleotide sequences. Optionally, the polynucleotide also codes for a 5' flanking sequence comprising SEQ ID NO: 19 and a 3' flanking sequence comprising SEQ ID NO: 22.

According to a third embodiment, the present invention provides a polynucleotide comprising a multiplexed microRNA-based shRNA encoding region, wherein said multiplexed microRNA-based shRNA encoding region comprises a sequence that codes for: (A) X artificial miRNA-based shRNA nucleotide sequences, wherein each artificial miRNA-based shRNA nucleotide sequence comprises (i) a miRNA scaffold sequence, (ii) an active sequence, wherein the active sequence of each of the artificial miRNA-based shRNA nucleotide sequences is 18-40 nucleotides long, and (iii) a passenger sequence, wherein within each artificial miRNA-based shRNA nucleotide sequence, the active sequence is at least 80% complementary to the passenger sequence and each passenger sequence is 18-40 nucleotides long; and (B) Y linker sequences, wherein each linker sequence is independently at least 80% identical to a sequence selected from the group of sequences consisting of SEQ ID NO: 1 to SEQ ID NO: 16, wherein X is greater than or equal to 2, and Y=X−1, wherein each linker sequence is located between a pair of consecutive artificial miRNA-based shRNA nucleotide sequences. Multiplexes that use these novel and non-obvious linkers efficiently silence multiplex targets.

In some embodiments in which the aforementioned linkers are used, in at least one artificial microRNA nucleotide sequence the scaffold sequence comprises a miR-196a-2 scaffold sequence or a sequence that is at least 80% the same as an miR-196a-2 scaffold sequence or a truncated miR-196a-2 scaffold sequence. In some embodiments, at least two of the artificial microRNA nucleotide sequences have a scaffold sequence that comprises a miR-196a-2 scaffold sequence or a sequence that is at least 80% the same as an miR-196a-2 scaffold sequence or a sequence that is a truncated miR-196a-2 sequence. In some embodiments, in each artificial microRNA nucleotide sequences the scaffold sequence comprises a miR-196a-2 scaffold sequence or a sequence that is at least 80% the same as an miR-196a-2 scaffold sequence.

According to a fourth embodiment, the present invention provides an expression vector comprising: (A) a multiplexed microRNA-based shRNA encoding region of the present invention; (B) a 5' flanking sequence, wherein the 5' flanking sequence is, for example, 30 to 180 nucleotides long and is located upstream of the multiplexed microRNA-based shRNA encoding region; and (C) a 3' flanking sequence, wherein the 3' flanking sequence is, for example, 30 to 180 nucleotides long and is located downstream of the multiplexed microRNA-based shRNA encoding region.

In some embodiments, the multiplexed microRNA-based shRNA encoding region is comprised of a sequence that encodes a plurality of miR-196a-2 scaffold repeats separated by linkers of the same or variable lengths. The plurality of scaffold repeats may form a multiplex, also referred to as a cluster of shRNAs, that is flanked on each of the 3' and 5' ends by, for example, 30 nucleotides to 180 nucleotides. The cluster may be positioned downstream from a promoter site such as for an RNA polymerase II dependent promoter. By way of a non-limiting example, there may be multiple copies of a scaffold comprising SEQ ID NO: 31 or a sequence that is at least 80% the same as SEQ ID NO: 31, or a sequence that is a truncated version of SEQ ID NO: 31, wherein the truncated version is lacking 1-6 nucleotides on either its 5' end or its 3' end.

According to a fifth embodiment, the present invention provides a method for reducing expression of one or a plurality of target nucleotides such as mRNA. The method comprises administering a polynucleotide or a vector of the present invention to a cell or an organism.

According to a sixth embodiment, the present invention provides a method of suppressing a plurality of genes, said method comprising introducing an expression vector into a cell or an organism, wherein the expression vector comprises a polynucleotide of the present invention.

According to a seventh embodiment, the present invention provides a use of the polynucleotides or vectors of the present invention as medicaments.

According to an eighth embodiment, the present invention provides a therapeutic cell comprising a polynucleotide or vector of the present invention.

The various embodiments of the present invention may be used to reduce and to control the expression of a single or multiple genes. The efficiencies that the various embodiments impart may be beneficial to basic research as well as in applied fields such as medicine, including but not limited to in vivo and ex vivo therapeutics, agriculture, and bioproduction.

DETAILED DESCRIPTION OF THE INVENTION

Figure 1:
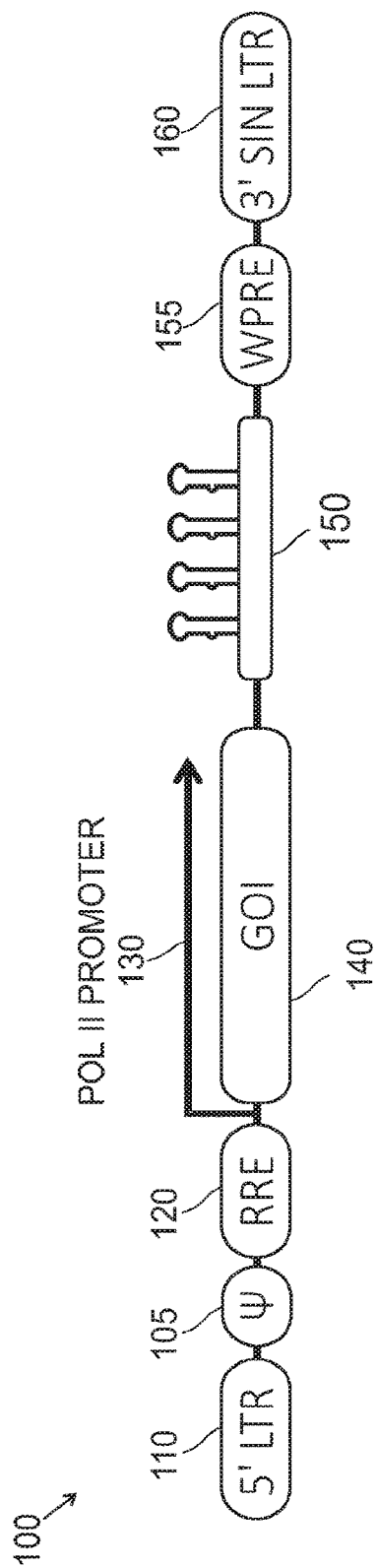
FIG. 1 is a representation of a vector of the present invention.

Reference will now be made in detail to various embodiments of the present invention, examples of which are illustrated in the accompanying figures. In the following description, numerous specific details are set forth in order to provide a thorough understanding of the present invention. However, unless otherwise indicated or implicit from context, the details are intended to be examples and should not be deemed to limit the scope of the invention in any way. Additionally, features described in connection with the various or specific embodiments are not to be construed as not appropriate for use in connection with other embodiments disclosed herein unless such exclusivity is explicitly stated or implicit from context.

Headers are provided for the convenience of the reader and do not limit the scope of any of the embodiments disclosed herein.

Definitions

Unless otherwise stated or implicit from context the following terms and phrases have the meanings provided below.

An "artificial miRNA-based shRNA" is a "precursor microRNA (pre-miRNA) or primary miRNA (pri-microRNA)" comprising a stem-loop structure that is a contiguous polynucleotide derived from specific endogenous miRNA in which the stem of the stem-loop structure incorporates an active strand-passenger strand duplex where the sequence of the active strand is distinct from the sequence of an endogenous active strand of the specific referenced miRNA. The sequence of the passenger strand of an artificial miRNA-based shRNA of the disclosure is also distinct from the endogenous passenger strand sequence of the specific referenced endogenous miRNA.

The sequences of an artificial miRNA-based shRNA outside of the active strand-passenger strand duplex (i.e., the loop and the regions of the stem on either side of the active strand-passenger strand duplex, and optionally including flanking sequences, as detailed below) are referred to herein as "miRNA scaffold," "scaffold portion," or simply "scaffold." Thus, in another aspect, the disclosure provides miRNA scaffolds useful for the generation of artificial miRNA-based shRNA sequences. An artificial miRNA-based shRNA sequence of the disclosure comprises a miRNA scaffold derived from (i.e. at least 60% identical to, up to and including 100% identical to) a specific endogenous miRNA and further comprises an active strand-passenger strand duplex that is not derived from that same specific endogenous miRNA. A single miRNA scaffold of the disclosure can be used to provide an almost unlimited number of different artificial miRNA-based shRNA sequences, each having the same miRNA scaffold sequence. Although the disclosure refers to an active strand and a passenger strand, persons of ordinary skill in the art will recognize that this is by convention, and includes when they are part of the same polynucleotide, e.g., a single stranded polynucleotide or of the same strand of a double stranded polynucleotide.

An "active sequence" is the sequence of the active strand that is partially or completely complementary to a target sequence and partially or completely complementary to a passenger sequence. An active sequence may also be referred to as a mature sequence. When a miRNA or shRNA sequence is processed by a cell, the active sequence may in some embodiments direct enzymes, or complexes of molecules to sequences of endogenous target molecules such as mRNA.

The phrase "codes for" and the term "encodes" mean that one sequence contains either a sequence that is identical to a referenced nucleotide sequence, a DNA or RNA equivalent of the referenced nucleotide sequence, or a DNA or RNA or a sequence that is a DNA or RNA complement of the referenced nucleotide sequence. Thus, when one refers to a sequence that codes for or encodes a recited DNA sequence, one refers to a sequence that unless otherwise specified is any one of the following: the same DNA sequence, a complement of the DNA sequence, the RNA equivalent of that sequence, or the RNA complement of that sequence.

The terms "microRNA," "miRNA," and "miR" are used interchangeably and refer to non-coding RNAs that are capable of entering the RNAi pathway and regulating gene expression.

The terms "short hairpin RNA," "small hairpin RNA," and "shRNA" are used interchangeably and refer to artificially designed single stranded RNAs that are capable of entering the RNAi pathway and regulating gene expression, and also are capable of forming stem and loop structures.

A "multiplexed microRNA-based shRNA" refers to a sequence that comprises a plurality of artificial miRNA-based shRNA sequences arranged linearly. Optionally, within a multiplexed microRNA-based shRNA there may be linker sequences between artificial miRNA-based shRNA sequences.

A "multiplexed microRNA-based shRNA encoding region" is a region of a polynucleotide that codes for a multiplexed microRNA-based shRNA.

A "multiplex" is a polynucleotide that encodes for a plurality of molecules of the same type, e.g., a plurality of siRNA or shRNA or miRNA. Within a multiplex, when molecules are of the same type (e.g., all shRNAs), they may be identical or comprise different sequences. Between molecules that are of the same type, there may be intervening sequences such as the linkers described herein or there may be an absence of linkers. An example of a multiplex of the present invention is a polynucleotide that encodes for a plurality of tandem miRNA-based shRNAs. A multiplex may be single stranded, double stranded or have both regions that are single stranded and regions that are double stranded.

A "nucleotide" is ribonucleic acid or deoxyribonucleic acid that contains a phosphate moiety, a ribose sugar molecule, and a nitrogenous base. As persons of ordinary skill in the art will recognize, in DNA, the four naturally occurring bases are adenine (A), cytosine (C), guanine (G), and thymine (T), while in RNA, the bases are A, C, G, and uracil (U). When going from RNA to DNA, the complement of A is T and of U is A, and when going DNA to RNA (i.e., transcription) the complement of T is A and of A is U. Unless otherwise specified, a nucleotide may be unmodified or modified at any of its nitrogenous base, sugar, or backbone locations.

An "off-target" effect is the silencing or reduction of translation of a gene other than the intended gene to which an active sequence has a sufficient degree of complementarity. Off-target effects may, for example, be due in part or wholly to the silencing by the passenger sequence. Additionally or alternatively, off-target effects may be due to similarity of endogenous sequences within the genome of a cell or organism or within a set of expressed mRNA that have the same or different degrees of complementarity to an active sequence.

A "passenger sequence" is the portion of the shRNA that is partially or completely complementary to the active sequence. A passenger sequence may also be referred to as a star sequence.

A "polynucleotide" is a molecule that contains a plurality of nucleotides that are modified or unmodified or a combination thereof. A polynucleotide may be RNA, DNA or a combination thereof, and single stranded or double stranded or contain both regions that are single stranded and regions that are double stranded. Within the scope of the present invention, polynucleotides may be vectors that contain the recited sequences or elements and encode for multiplex shRNAs. The length of a polynucleotide or a region or sequence within a polynucleotide may be defined by the number of nucleotides, which is understood to mean the number of consecutive nucleotides.

The terms "prevent," "preventing," and "prevention" refer to the treatment with or administration of a polynucleotide or vector of the present invention, with or without an additional polynucleotide, vector, or other compound such as an active ingredient of a medication, prior to the onset of symptoms, particularly to patients at risk of a disease or disorder.

A "scaffold" is the portion of a miRNA that excludes the active sequence and passenger sequence of the miRNA.

A "target" is a molecule that has a DNA or RNA sequence that is partially or fully complementary to an active sequence. The "target sequence" is the sequence of the target to which an active sequence has a desired level of complementarity and can be described using the four bases of DNA (A, T, G, and C), or the four bases of RNA (A, U, G, and C). A "target organism" is an organism in which a target sequence is present, and to which a polynucleotide or vector as described herein can be administered. An "organism" is an individual animal, plant, multicellular or single-celled life form. Typically, but not exclusively, an organism is a multicellular organism.

A "therapeutic cell" is a cell that is selected for or is administered to a subject based on the ability of the cell to offer a therapeutic benefit to the subject. Examples of cells that may be therapeutic cells include but are not limited to any eukaryotic cell such as a plant, avian, or mammalian, e.g., cell or a of human or other animal. Types of cells that may be therapeutic cells include, but are not limited to, hematopoietic stem/progenitor cells, memory T cells, regulatory T cells, B cells, macrophages, induced pluripotent stem cells ("iPSC"), and invariant natural killer T cells.

The terms "treat," "treating," and "treatment" refer to alleviating or abrogating a disease or disorder, or one or more of the symptoms associated with the disease or disorder, or to slowing the progress of a disease or disorder.

Multiplexed microRNA-Based shRNA Encoding Regions

The polynucleotides of the present invention comprise, consist essentially of, or consist of a multiplexed microRNA-based shRNA encoding region. The multiplexed microRNA-based shRNA encoding region encodes for two or more artificial miRNA-based shRNA sequences. Each of the artificial miRNA-based shRNA sequences contains a miRNA scaffold sequence, an active sequence, and a passenger sequence. In some embodiments, each portion of the multiplexed microRNA-based shRNA encoding region that contains an artificial shRNA sequence is capable of forming a stem and loop structure. Within the stem and loop structure, the active and passenger sequences form at least part, if not all of the stem. The multiplexed microRNA-based shRNA encoding region may comprise a plurality of miRNA-based shRNAs that are cleaved from each other to form shRNAs, or the multiplexed microRNA-based shRNA may be transcribed into microRNAs or copied and subsequently transcribed into microRNAs that may be processed to form a plurality of shRNAs.

In some embodiments, the multiplexed microRNA-based shRNA encoding region codes for more than two artificial miRNA-based shRNA sequences, more than three artificial miRNA-based shRNA sequences, more than four artificial miRNA-based shRNA sequences, more than five artificial miRNA-based shRNA sequences, more than six artificial miRNA-based shRNA sequences, more than seven artificial miRNA-based shRNA sequences, or more than eight artificial miRNA-based shRNA sequences. In some embodiments, within a multiplexed microRNA-based shRNA encoding region, there are two to twelve artificial miRNA-based shRNA sequences or two to ten artificial miRNA-based shRNA sequences or three to ten artificial miRNA-based shRNA sequences or three to eight artificial miRNA-based shRNA sequences. In some embodiments, there are two, three, four, five, six, seven, eight, nine, ten, eleven, or twelve artificial miRNA-based shRNA sequences within a multiplexed microRNA-based shRNA encoding region. The code or sequence of the artificial miRNA-based shRNA sequences may be arranged linearly 5' to 3' or 3' to 5' in a polynucleotide.

The scaffolds of the artificial miRNA-based shRNA sequences may be either naturally occurring microRNA scaffolds or artificially created scaffolds, i.e., not identical to the sequence of any naturally occurring scaffold. In some embodiments, one, more than one, or all of the scaffolds are selected or designed such that for the miRNA coded therein, there is strand selection bias that would allow higher functionality for the active strand compared to the passenger strand. In some embodiments, the bias leads to at least 20%, 30%, 40%, 50%, 60%, 70% or 80% greater silencing by the active strand than the passenger strand.

In some embodiments, one or more scaffolds are derived from a naturally occurring sequence, and thus although not identical to a naturally occurring sequence, one or more or each scaffold has a sequence that is at least 80%, at least 85%, at least 90%, or at least 95% identical to a naturally occurring scaffold sequence. By way of non-limiting examples, the scaffolds may be the same as or derived from the following miRNAs: miR-196a-2 (hsa-mir-196a-2), miR-26b (hsa-mir-26b), miR-204 (hsa-mir-204), and miR-126 (hsa-mir-126). Additional miRNA scaffold sequences that are of use in the present invention may be identical to or derived from a scaffold of hsa-let-7f, hsa-let-7g, hsa-let-7a, hsa-let-7b, hsa-let-7c, hsa-mir-29a, hsa-mir-140-3p, hsa-let-7i, hsa-let-7e, hsa-mir-7-1, hsa-mir-7-2, hsa-mir-7-3, hsa-mir-26a, hsa-mir-26a, hsa-mir-340, hsa-mir-101, hsa-mir-29c, hsa-mir-191, hsa-mir-222, hsa-mir-34c-5p, hsa-mir-21, hsa-mir-378, hsa-mir-100, hsa-mir-192, hsa-mir-30d, hsa-mir-16, hsa-mir-432, hsa-mir-744, hsa-mir-29b, hsa-mir-130a, or hsa-mir-15a.

When a scaffold differs from a naturally occurring scaffold, the difference may, for example, be by virtue of the addition, deletion, or substitution (or combination thereof) of one or more nucleotides relative to the endogenous miRNA scaffold sequence. In some embodiments, the additions, deletions, or substitutions may be used or introduced because they enhance the functionality of the miRNA-based shRNA. In some embodiments, one, a plurality or all of the scaffolds are truncated at either or both of their 5' ends and 3' ends. When a scaffold is truncated, the amount of truncation should not adversely affect functioning of the scaffold. For example, the truncation may be of one to six or one to five or four to six or four to five nucleotides from the 5' end, the 3' end or both the 5'end and the 3' end of the scaffold (e.g., the miR-196a-2 scaffold) relative to the native sequence of the scaffold.

Within the multiplexed microRNA-based shRNA encoding region, the scaffold of each artificial miRNA-based shRNA sequence for which the miRNA-based shRNA encoding region codes may be identical, or at least two of them may be different, or each of them may be different. Further, in some embodiments, the scaffolds may be arranged randomly or based on size of the scaffolds themselves or of the active sequences or of the combined length of the scaffolds and active sequences (e.g., largest to smallest or vice versa), or prevalence of expression of target genes (e.g., most prevalent to least or vice versa) or by GC content.

Within the multiplexed microRNA-based shRNA encoding region, the active sequence of each artificial miRNA-based shRNA sequence may be the same, or at least two of them may be different, or each of them may be different. Two sequences are different if they are not identical. Thus, under conditions of maximal alignment, there is at least one difference (addition, substitution or deletion) between the sequences. In some embodiments, under conditions of maximal alignment, no more than 95%, 90%, 85%, 80%, 75%, 70%, 65%, 60%, 55%, 50%, 40%, or 35% of the nucleotides are identical.

In some embodiments, each active sequence is 18-40 nucleotides long or 18 to 35 nucleotides long or 20 to 30 nucleotides long. Each passenger sequence may be the same length as the active sequence or shorter or longer (thereby causing bulges) and in some embodiments is 18-40 nucleotides long or 18 to 35 nucleotides long or 20 to 30 nucleotides long. In some embodiments, each passenger sequence is 100% complementary to its corresponding active sequence or at least 80%, at least 85%, at least 90%, or at least 95% complementary to its corresponding active sequence.

In some embodiments, there is at least one mismatch between the active sequence and the passenger sequence. For example, within one or each artificial miRNA-based shRNA nucleotide sequence the passenger sequence may be complementary to the active sequence except that position 1 of the active sequence codes for T or U and the opposite nucleotide in the passenger sequence codes for G, and a duplex formed by the active sequence and the passenger sequence contains a mismatch at position 12 of the active sequence and either no additional mismatches or wobble pairs, or mismatches or wobble pairs at one or more of positions 5, 18, 19, 20, 21, 22, or 23 and no mismatches or wobble pairs at any of positions 2, 3, 4, 6-11 and 13-17 of the active sequence of the duplex, wherein positions of the active sequence are numbered relative to the 5' end of the active sequence and optionally wherein the active sequence of the duplex is between about 19 and 25 nucleotides long.

Preferably, each active sequence is designed to be at least 80%, at least 85%, at least 90%, or at least 95% complementary to a target sequence. In some embodiments, within a multiplex, each active sequence may be complementary to a target sequence that corresponds to a region of a different target molecule. In other embodiments, two or more active sequences may be complementary to the same target sequence or to partially overlapping target sequences of the same target molecule or to non-overlapping target sequences of the same target molecule. In other embodiments, all active sequences may be complementary to the same target sequence or to partially overlapping target sequences of the same target molecule or to non-overlapping target sequences of the same target molecule. A target sequence may, for example, correspond to a DNA sequence, such as a region of a chromosome or mitochondrial DNA, or an RNA sequence such as an mRNA sequence or a region thereof or a viral nucleotide sequence or a region thereof. The larger DNA sequence or RNA sequence of which the target sequence is a part, may be located on a target molecule, such as a chromosome, a mitochondrial DNA, or an RNA molecule such as an mRNA.

The polynucleotide may be single stranded or double stranded. When double stranded, a first strand may comprise all of the artificial miRNA-based shRNA sequences and any linker sequences if present, and in some embodiments, a second strand contains sequences that are complementary to each artificial miRNA-based shRNA sequence and each linker sequence if present. In other embodiments in which the polynucleotide is double stranded, the second strand does not contain any sequences that are complementary to any of the artificial miRNA-based shRNA sequences that are on the first strand. In the latter embodiments, within the polynucleotide, the artificial miRNA-based shRNA sequences may form hairpins or stem and loop structures, with the regions that encode for active sequences and the regions that encode for passenger sequences forming part or all of the stem of the stem and loop structures. In a second strand that does not contain sequences complementary to artificial miRNA-based shRNA sequences, there may or may not be sequences that are complementary to one or more or all of the linker sequences if present and/or flanking sequences if present.

Linkers

In some embodiments there are no linkers and the scaffolds are situated immediately adjacent to each other. In other embodiments, between at least two or between each consecutive pair of artificial miRNA-based shRNA sequences is a linker sequence. Thus, if there are X artificial miRNA-based shRNA sequences, there will be up to Y linker sequences, wherein X≥2 and Y=X−1. In some embodiments, the linker, if present, may be 1-60 nucleotides long, 30-60 nucleotides long, or 40-50 nucleotides long. In some embodiments, the linkers are short, e.g., 6 or fewer nucleotides or 4, 5, or 6 nucleotides. In some embodiments there is linker of six or fewer nucleotides and a truncation of up to six nucleotides from either or both of the 5' end and 3' end of the scaffold. By way of non-limiting examples, each linker could be 4 to 6 A nucleotides or 4 to 6 C nucleotides or 4 to 6 G nucleotide, or 4 to 6 U nucleotides, or any combination of A, G, C or U nucleotides.

In some embodiments, at least one, at least two, or all linkers are created so as to minimize the likelihood that the linkers will hybridize to a naturally occurring nucleotide sequence in the organism or cell into which it will be introduced. In some embodiments, the linker sequence is neither identical nor complementary to any naturally occurring sequence. In some embodiments, the linker is not more than 95% or 90% or 85% or 80% or 75% or 70% or 65% or 60% or 55% or 50% or 45% or 40% identical or complementary to any naturally occurring sequence in the organism or cell into which the polynucleotide or vector of the present invention is introduced.

In some embodiments, between consecutive artificial miRNA-based shRNA sequences only linker sequences are present and no intervening or additional sequences are present. In other embodiments, additional sequences may be present. Within a polynucleotide of the present invention when two or more linkers are present, two or more of the linkers may be the same or two or more of them may be different, or all may be the same or each may be different.

In some embodiments, each linker sequence comprises or consists of a sequence that is 100% identical or complementary to a sequence selected from the group of sequences consisting of SEQ ID NO: 1 to SEQ ID NO: 16, or at least 80%, at least 85%, at least 90%, or at least 95% identical or complementary to a sequence selected from the SEQ ID NO: 1 to SEQ ID NO: 16. When, for nucleic acids, a % identity is used (e.g., 80% identical), this typically should be interpreted as identical over the whole length of the contiguous reference sequence under maximal alignment and not over a small part of it, or over non-contiguous stretches. Thus, a sequence is only 80% identical to a reference sequence if it is 80% identical over the full length, e.g., 4 out of 5 nucleic acid residues in a stretch are identical.

Flanking Sequences

In some embodiments of the present invention, the multiplexed microRNA-based shRNA encoding region is flanked by a 5' flanking sequence and/or a 3' flanking sequence. By way of non-limiting examples, each of these flanking regions may be 30 to 180 nucleotides long or 50 to 160 nucleotides long or 80 to 120 nucleotides long.

Examples of 5' flanking sequences include sequences that comprise, consist essentially of, or consist of SEQ ID NO: 17-SEQ ID NO: 19 or complements thereof, as well as sequences that are at least 80%, at least 85%, at least 90%, at least 95%, or at least 98% identical to any of SEQ ID NO: 17-SEQ ID NO: 19 and complements thereof.

Examples of 3' flanking sequences include sequences that comprise, consist essentially of, or consist of SEQ ID NO: 20-SEQ ID NO: 22 or complements thereof, as well as sequences that are at least 80%, at least 85%, at least 90%, at least 95%, or at least 98% identical to any of SEQ ID NO: 20-SEQ ID NO: 22 and complements thereof.

miR-196a-2 Multiplex

In some embodiments, there are one or more artificial miRNA-based shRNA sequences that comprise a sequence that is identical to or is derived from miR-196a-2. In some embodiments, at least one, at least two, or all of the scaffolds comprises (SEQ ID NO: 31):

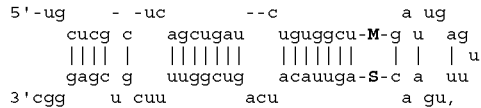

wherein M is a mature sequence (also referred to as an active sequence) and S is a star sequence (also referred to as a passenger sequence). In some embodiments, each artificial miRNA-based shRNA nucleotide sequence is defined by (SEQ ID NO: 32):

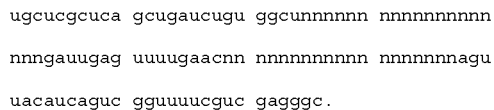

In some embodiments, in at least one artificial miRNA-based shRNA nucleotide sequence the scaffold sequence comprises an miR-196a-2 scaffold sequence or a sequence that is at least 80%, at least 85%, at least 90%, or at least 95% identical to an miR-196a-2 scaffold sequence or truncated miR-196a-2 scaffold sequence. In some of these embodiments, in at least two artificial miRNA-based shRNA nucleotide sequences the scaffold sequence comprises a miR-196a-2 scaffold sequence or a sequence that is at least 80%, at least 85%, at least 90%, or at least 95% identical to an miR-196a-2 scaffold sequence or truncated miR-196a-2 scaffold sequence. In some embodiments, each and every artificial miRNA-based shRNA nucleotide sequence comprises a miR-196a-2 scaffold sequence or a sequence that is at least 80%, at least 85%, at least 90%, or at least 95% identical to an miR-196a-2 scaffold sequence or truncated miR-196a-2 scaffold sequence.

In some embodiments, the multiplex of the present invention is encoded in a vector that also encodes a miRNA mimic. The code for the miRNA mimic may be upstream or downstream of the code for the multiplex. Further, expression of the miRNA mimic may be within the same transcript of the multiplex or within a separate transcript. Examples of miRNA mimics include but are not limited to MISSION® human miRNA mimics from Sigma-Aldrich, miRIDIAN® microRNA mimics from Dharmacon, Inc., miScript® miRNA mimics from Qiagen, and mirVana™ mimics from Life Technologies. A mimic may be the same as an miRNA or be at least 80% similar, at least 90% similar or 100% similar to the miRNA.

Vectors

Various embodiments of the present invention are directed to the use of single or double stranded vectors for delivery and/or expression of a polynucleotide of the present invention such as a multiplex cassette that encodes for a plurality of miRNA-based shRNAs. These vectors may comprise, consist essentially of, or consist of DNA, RNA, or DNA/RNA hybrids. Examples of vectors include but are not limited to plasmids, mini-circle DNA, closed-linear DNA (also known as Doggybone® DNA), in vitro transcribed or synthetic RNA or messenger RNA, and viral vectors. Examples of viral vectors include but are not limited to adenovirus vectors, vaccinia vectors, retroviral vectors, adeno-associated viral vectors, herpes simplex virus vectors, Sendai virus vectors, and Semliki Forest virus vectors.

FIG. 1 illustrates a vector design 100 of the present invention in which within a lentiviral vector that expresses a gene of interest ("GOI"), a selection marker, or reporter or combination thereof is followed by a multiplexed microRNA-based shRNA cassette. In an order of 5' to 3', the vector as shown contains a 5' long tandem repeat (LTR) sequence 110, a retroviral Psi packaging element 105, a reverse response element (RRE) 120, a Pol II promoter site 130, a GOI sequence 140, a multiplex microRNA-based shRNA 150 of the present invention, a Woodchuck Hepatitis Virus (WHP) Posttranscriptional Regulatory Element (WPRE) 155, and a 3' SIN (self-inactivating) LTR sequence 160.

Figure 2:
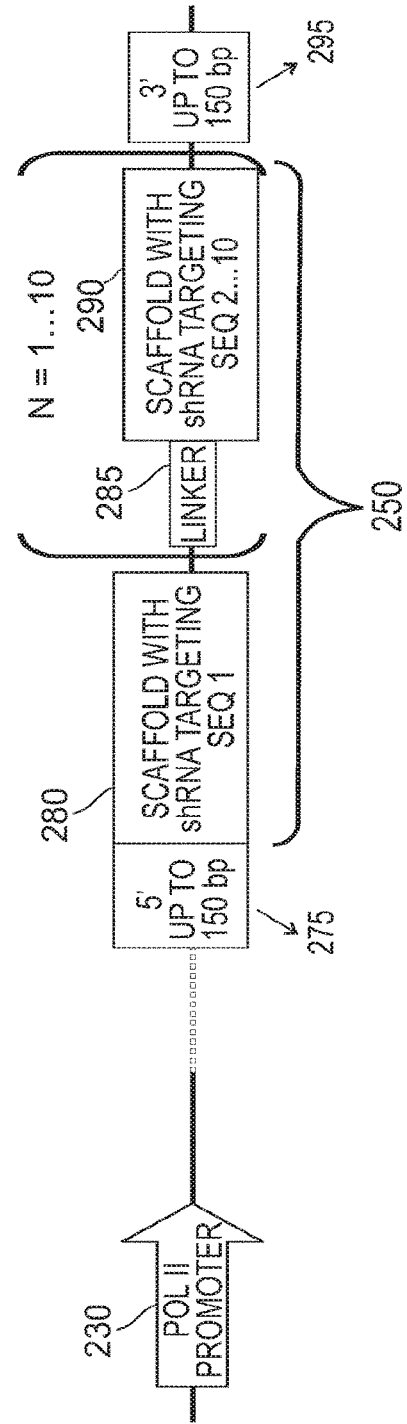
FIG. 2 is a representation of another vector of the present invention.

FIG. 2 shows an example of a multiplex cassette of the present invention within a vector. Upstream of the multiplex cassette 250, are a Pol II promoter 230 and a 5' flanking sequence 275. Downstream of the cassette is a 3' flanking sequence 295. Within the cassette are sequences that code for a multiplexed microRNA-based shRNA that targets a first sequence 280, and 1-10 repeat scaffolding unit sequences 290 that target different sequences as well as one or more linkers 285.

Methods for inserting cassettes such as polynucleotides of the present invention into vectors and generating vectors that contain cassettes are well known to persons of ordinary skill in the art. Examples include the use of synthetic or enzymatic generation of cassettes and the use of restriction enzymes and ligases to insert cassettes. Specific examples of methods for creating vectors are described in Fowler et al., *Improved knockdown from artificial microRNAs in an enhanced miR-155 backbone: a designer's guide to potent multi-target RNAi*, Nucleic Acids Research, 2016, Vol. 44, No. 5, the entire disclosure of which is incorporated by reference.

Delivery

Delivery of the polynucleotides and vectors of the present invention may be active or passive. In some embodiments, vectors are selected and designed to target receptors or certain types of cells. Thus, they may be complexed with, conjugated to, or encapsulated by specifically chosen antigens. Additionally, delivery may be in vitro or in vivo, and it may be to a cell or to an organism. Examples of delivery include standard techniques for transduction and transfection. See e.g., Liu et al., *Inhibition of HIV-1 by multiple siRNAs expressed from a single microRNA polycistron*, Nucleic Acids Research, 2008, Vol. 36, No. 9, 2811-2824; Choi et al., *Multiplexing Seven miRNA-Based shRNAs to Suppress HIV Replication*, American Society of Gene and Cell Therapy, Vol. 23, no. 2, 310-320, February 2015. The entire disclosures of both of these references are incorporated by reference.

Additionally, delivery may be accomplished through the use of exosome/extracellular vesicle encapsulation of vectors or conjugation with nanoparticles. These technologies are described in Hundry, E. et al., *Exosome-associated AAV vector as a robust and convenient neuroscience tool*, Gene Therapy 23, 380-392 (2016) and Riley, Michael K., *Recent Advances in Nanomaterials for Gene Delivery—A Review*, Nanomaterials, 2017 May; 7 (5): 94, the disclosures of which are incorporated by reference.

Medicaments

In various embodiments, the present invention is directed to medicaments for the expression of the polynucleotides or vectors of the present invention. Additionally, various embodiments of the present invention provide uses of the vectors and polynucleotides of the present invention as medicaments. A medicament may be administered actively or passively, and may be administered alone or co-administered with one or more other polynucleotides, vectors, active ingredients and/or inactive ingredients. The medicament may be for the treatment of cancer, genetic and degenerative diseases, infectious diseases, autoimmune diseases and others, as described below.

Cells

The polynucleotides and vectors of the present invention can be introduced to or used in desired cell types, which may be referred to as target cells. Accordingly, in various embodiments, the present invention is directed to therapeutic cells that are capable of expressing the vectors or polynucleotides of the present invention.

A target cell may, for example, be selected based on a disease or disorder to be treated. The cell or cells may be derived from, obtained from, or contained within a human or animal other than a human (e.g., any mammal such as a primate). Examples of human target cells include, but are not limited to, liver cells, pancreatic cells, skeletal muscle cells, fibroblasts, retinal cells, synovial joint cells, cells involved in hearing processes, lung cells, T cells, B cells, macrophages, NK cells, neurons, glial cells, stem cells (including iPSCs), endothelial cells, and cancer cells. In some embodiments, the cells are derived from a cell line, or an iPS cell.

A cell containing a polynucleotide or vector of the present invention may be provided for use in the manufacture and/or development of a drug for therapy or diagnosis. Additionally, a cell containing a polynucleotide or vector of the present invention may be provided for use in the manufacture of a medicament for the treatment or prevention of a disease, disorder, or condition. In some embodiments, a cell containing a polynucleotide or vector of the present invention is provided for use in the manufacture and/or development of a drug or vaccine for use in medicine, such as use as a medicament.

In some embodiments, the present invention is directed to transforming a cell line by introducing a vector or polynucleotide of the present invention into the cell line.

In other embodiments, the present invention is directed to use of a cell line in accordance with the present invention in the manufacture of a medicament for use in treatment of a disease, disorder or condition, wherein the cell line comprises a polynucleotide or vector of the present invention.

Cell lines for use in connection with the present invention may, for example, be selected from commercial vendors or developed by persons of ordinary skill in the art, and/or selected or developed from a subject in need of treatment. Examples of cell lines include but are not limited to U2OS, HEK293T, HEK293, HeLa, A549, LoVo, PC6, PC12, NIH/3T3, and CHO, as well as in vivo and ex vivo cells.

Additionally, various embodiments of the present invention also provide cell lines that are produced or used in accordance with any of the other embodiments of the present invention for use in therapy. In one embodiment, the present invention is directed to methods for generating therapeutic cells such as CAR T cells. The CAR T cells may be derived from primary T cells or differentiated from stem cells. Suitable stem cells include, but are not limited to, mammalian stem cells such as human stem cells, including, but not limited to, hematopoietic, neural, embryonic, induced pluripotent stem cells (iPSC), ectodermal, endodermal, mesendermal, liver, pancreatic, muscle, and retinal stem cells. Other stems cells include, but are not limited to, mammalian stem cells such as mouse stem cells, e.g., mouse embryonic stem cells.

In various embodiments, a polynucleotide or vector of the present invention may be used to knockdown the expression of a single gene or multiple genes in various types of cells or cell lines, including but not limited to cells from mammals. The technology may be used to knock down genes to prevent graft versus host disease by making non-host cells non-immunogenic to the host or resistant to attack by the host. Such genes include, but are not limited to, the major histocompatibility complex (MHC) genes, including coreceptors (HLA-F, HLA-G), molecules for antigen presentation (26 class I and 24 class II genes), the innate immune response (MICA, MICB, HCP5), inflammation (NKBBIL, LTA, TNF, LTB, LST1, NCR3, AIF1), immune receptors (LY6), heat shock proteins (HSPA1L, HSPA1A, HSPA1B), complement cascade, regulatory receptors (NOTCH4), antigen processing (TAP, HLA-DM, HLA-DO), and peptide transport (RING1).

The technology may also be used to knock down genes that are involved in fratricide of immune cells, such as T cells and NK cells, or genes that alert the immune system of a patient or animal that a foreign cell, particle or molecule has entered a patient or animal, or genes encoding proteins that are current therapeutic targets used to compromise or boost an immune response, for example, CD52, CTLA4, CD47, HAVCR2, CD274, CD95, A2AR, CD7, TET2, CCR6, PD1 and PDCD1. The technology may also be used to generate transgenic animals that can be used as disease models or for gene function studies.

Suppression of Genes

In various embodiments, the present invention provides a method for suppressing one or more target genes. In some embodiments, expression of two or more, or all targeted genes is reduced to a level of less than 60%, less than 50%, less than 40%, less than 30%, less than 20%, or less than 10% of what expression would be in the absence of expression of the vector. The methods comprise administering and/or causing expression of a polynucleotide or vector of the present invention. These methods can be carried out in vitro or in vivo.

Therapeutic Applications

In some embodiments, the present invention provides applications for therapy, such as gene therapy, including but not limited to the treatment of diseases and disorders. For example, various embodiments of the present invention may be used to treat cancer. In these applications, the shRNAs that are produced from the multiplexes of the present invention may be used to downregulate the expression of genes that are involved in tumor survival and progression, metastasis, or resistance to chemo- or immunotherapy. Examples of cancers that may be treated according to the present invention include, but are not limited to, ovarian cancer, breast cancer, gastric cancer, melanoma, pancreatic cancer, colorectal cancer, cervical cancer, gliomas, multiple myeloma, osteosarcoma, lung cancer, liver cancer, prostate cancer, leukemia and lymphoma.

Potential application for shRNAs also include but are not limited to treating or preventing genetic and degenerative diseases such as: Alzheimer's disease, Parkinson's disease, Huntingdon's Disease, oculopharyngeal muscular dystrophy, myotubular myopathy, myotonic dystrophy, Familial Cardiomyopathy diseases, spongiform leukodystrophy, retinitis pigmentosa, Machado-Joseph disease, Sorsby's Fundus Dystrophy, hemoglobinopathies, amyotrophic lateral sclerosis (ALS). Further examples, include Age-related Macular Degeneration, amyloidosis, and hyperlipidemia.

Infectious diseases can also benefit from the use of the shRNAs for gene downregulation through the use of the technologies described herein. Examples include, but are not limited to, hepatitis B, hepatitis C, human papilloma virus infections (and prevention of HPV-related cervical cancer), human immunodeficiency virus, coronaviruses, and others.

Additional potential therapeutic applications may also include but are not limited to: prevention of neointima formation in cardiovascular disease, anti-thrombosis, amelioration of neuropathic pain, treatment of ocular disorders, reduction or treatment of neuronal injury, prevention or reduction of graft-versus-host disease (e.g., generation of allogeneic cells, such as CAR T cells, for cancer therapy), induction of pluripotent cells, treatment of autoimmune disease, such as Type I diabetes, Lupus, Rheumatoid arthritis and Multiple Sclerosis, and treatment of autism spectrum disorders and other developments disorders such as Fragile X Syndrome. The present invention can also be used to treat diseases involving mutations in autosomal genes such as, Cystic Fibrosis, Xeroderma Pigmentosum and Marfan syndrome, by using a silence and replace approach. In this approach mutant gene is knocked down using shRNA specific to the sequence of the mutant gene. The knocked down gene is simultaneously replaced by a wild type, functional version of the gene.

Bioproduction

Bioproduction refers to the production of biologics-based therapeutic drugs including, but not limited to, protein-based therapeutics, vaccines, gene therapies as well as cell therapies. Through various embodiments of the present invention, one can produce shRNAs that can be employed to improve the production of biologics and/or improve, augment, or enhance the performance and viability of the cells producing the biologics. Such cells include but are not limited to Chinese hamster ovary (CHO), baby hamster kidney (BHK21), murine myeloma cells (NSO and Sp2/0), human embryonic kidney 293 (HEK 293), fibrosarcoma HT-1080, human PER.C6®, and insect cells.

Agribusiness

Agribusiness refers to the business of agriculture production. Through various embodiments of the present invention, one can produce shRNAs that can be employed to improve feedstock by engineering animals resistant to diseases or improving growth or other traits such as muscle mass.

EXAMPLES

In the examples that follow, the experimental protocols described below were used:

Multiplex microRNA-Based shRNA Cloning

Vectors were generated by standard molecular biology protocols. Multiplex microRNA-based shRNA cassettes were cloned by ligation of multiple annealed double-strand 5'-phosphorylated oligonucleotides bearing 3 to 7 nucleotide overhangs complementary to the overhangs of flanking double-strand oligonucleotides of the vector backbone. Ligations were carried out using the T4 DNA ligase. Clones were verified by Sanger sequencing.

Lentiviral Particles

Lentiviral particles were produced in HEK293T cells using the Trans-Lentiviral shRNA Packaging System (Horizon Discovery/Dharmacon). Titers of the packaged lentiviral particles were estimated by flow cytometry by determining the number of green-fluorescence positive cells in HEK293T cells transduced for 72 hours. The titer was calculated according to the formula: titer=[F×(Co/V)]×D, where F is the relative frequency of GFP-positive cells determined by flow cytometry, Co is the initial number of target cells in the culture well, V is the volume of the inoculum, and D is the virus dilution factor. Only culture wells with a frequency of GFP+ cells equal or higher than two but equal to or lower than 20% were used for the titer calculation.

Vectors with miR-196a-2 scaffolds were generated based on the original SMARTvector® lentiviral backbone (SEQ ID NO: 31). Generation of multiplexed microRNA-based shRNA utilized enzymatic ligation of multiple synthetic oligonucleotides in the referred lentiviral vector backbone. Subsequently, lentiviral particles were generated and titers were determined by flow cytometry.

Gene knockdown efficiency was determined by the relative expression of the gene target mRNA compared to housekeeping genes. The mRNA levels were measured by reverse-transcription followed by quantitative PCR in cells transduced with the SMARTvector® multiplex lentiviral particles and selected for at least 5 days.

Cell Transduction for Gene Knockdown

HEK293T and U2OS cells were plated at 5,000 cells per well in a 96-well plate a day prior to transduction. Cells were transduced on the following day at a multiplicity of infection (MOI) of 1 or 3 based on the obtained viral titer for each virus. The medium on the wells was changed at 24-hours post-transduction with medium containing 2 µg/mL of puromycin to begin selection. The cells were observed under a microscope 48-hours post-selection. Cells that appeared confluent or nearing confluency, were split at a ratio of 1:5. The cells were harvested at 10-days post-transduction by removing the medium and storing the cells at −80° C. until used for RNA isolation and cDNA generation.

RNA Isolation and cDNA Generation

Cells were lysed with a mixture of 4 M guanidine thiocyanate (GTC), 10 mM Tris (pH 7.5), and 0.97% β-mercaptoethanol. RNA was collected from the cells by binding onto a Promega RNA binding plate. The RNA was washed using a mixture of 60 mM potassium acetate, 10 mM Tris-HCl (pH 7.5), and 60% ethanol. The RNA was eluted from the binding plate using RNase- and DNase-free water.

cDNA generation was completed using the Thermo Scientific Maxima First Strand cDNA Synthesis Kit for RT-qPCR with dsDNase using the manufacturer's suggested protocol.

RT-qPCR

RT-qPCR was completed using TaqMan Universal PCR Master Mix with TaqMan Gene Expression Assays using the manufacturer's suggested protocol. Analysis of gene knockdown was completed using the ΔΔCq method (Pfaffl MW. 2001. *A new mathematical model for relative quantification in real-time RT-PCR*, Nucl. Acids Res., 29: e45).

Example 1: Design of Constructs

A number of multiplex cassettes were designed with linkers. Sixteen linkers that were designed appear in Table I below. All sequences are provided with reference to deoxyribonucleotides, but as persons of ordinary skill in the art will recognize, these sequences encode both RNA and DNA sequences and their complements.

TABLE I

| Sequence ID No: | Sequence |
| --- | --- |
| 1 | GAATCCAACTTACTTCTTCACGACAACACTTACCTTTGTGCAAGCACTTATGATCCTGAT |
| 2 | GAGTCCAATTTACTTCTTCACACATTCCTGTATTTGCAAGCACTTGTCCTGA |
| 3 | GCTCTTTACTCCTCGCCTATTGAGACCTTTAGGATGCGGAAACTGCTTTACTTAACATCT |
| 4 | TGTTGGATGTGGACACTTCTTTACTAATACCTTGTTAACTGGTCTTAATACG |
| 5 | CTTCGATACGATACAGCGGTATGGTGCACCTCAAATCCTGTGGTC |
| 6 | TCGGGCACTTCAATTCCGTAGTTATCTTGAACCTTCGTGGAGCGACAGATACATCT |
| 7 | TCCTCGTACATATAGCATGACTAGCTTTGTGACCTTTGAC1TTCTCTATCAATCTAT |
| 8 | ACATGAGGATATCAGGTAGTCTGCAACACTCTAAGGGCGGTTATCTGTGGT |
| 9 | ATCCAACTTACGTATCCAATATCGGTCTTGCTAATCATGTGTCCTGTTAC |
| 10 | TTCGATCGATACGATAGCGGGGAGTTCGCGTTGTTCCGACGTTGTACACTT |
| 11 | TGCTAACGTCGGTGATCGCGCGAAATAGTCTAGGGCCGACCGGGTCGC |
| 12 | TAGAGTACGAGTCGGCGAACAGTTACATCGAAGTCGCGTC |
| 13 | TCACCACAACACATTCCTTTATTGTAGCAA |
| 14 | CTGAGCTATGCCACCTGGGATGCCTTCACG |
| 15 | CCTGTTAACTGGTCTTAATACGGTGTCTCC |
| 16 | TCGGGCACTTCAATTCCGTAGTTATCTTGAACCTTCGTGGAGCGACAGATACATGC |

The linkers identified in Table I were incorporated into different vectors that had one of the following three 5' flanking sequences:

(SEQ ID NO: 17)
TCAGACCCCTTACCCACCCAGCAACCCAAAGTCTACTCTCTAGTCCTTAGG

GAGGTTGTGGGGGCGGAAAGGGGGACGGGGCTGAATTTCTTCCTTCCCCA

ACCCCCTTCCCTTCTCCTCCAGATAGATGCAAAGCTGAATCTCCCGCCC;

(SEQ ID NO: 18)
GCGGAAAGGGGGACGGGGCTGAATTTCTTCCTTCCCCAACCCCCTTCCCTT

CTCCTCCAGATAGATGCAAAGCTGAATCTCCCGCCC;

and (SEQ ID NO: 19)
CCAATCGAGCTCTCCCACTCCTACCCTCCCCAGTGGG.

Each of the vectors had one of the following three 3' flanking sequences:

(SEQ ID NO: 20)
CCAATCGAGCTCTCCCACTCCTACCCTCCCCAGTGGGACTGCCCCACTGCC

CCCTCCCAGATAGGGCAAAGTGGGTGCAGACCAAGGAGGACAAGCTGTG

AGTGGGGTTGCAGAACAAGTCTGGAGAACCCTGCTTTATGCCGTCCTCTA;

(SEQ ID NO: 21)
CCAATCGAGCTCTCCCACTCCTACCCTCCCCAGTGGGACTGCCCCACTGCC

CCCTCCCAGATAGGGCAAAGTGGGTGCAGA;

and (SEQ ID NO: 22)
CCAATCGAGCTCTCCCACTCCTACCCTCCCCAGTGGGA.

TABLE II

Eight cassettes with the active (mature) sequences and passenger (guide) sequences appear in Table II below as mature/guide, loop, and passenger. The target refers to the gene to which the mature sequence is complementary.

| SEQ ID NO | Target | Sequence |
|---|---|---|
| 23 | PPIB | TTCCGAAGAGACCAAAGATGGGATTGAGTTTTG<br>AACTCGTCTTTGCTCTCTTTGGAG |
| 24 | ILK | TATCAGCCATGCTAATTCGGGGATTGAGTTTTG<br>AACTCTGAATTACCATGGCTGATG |
| 25 | CDK5 | TCCCCAAAGAGGACATCCGGGGATTGAGTTTTG<br>AACTCCGGATGTGCTCTTTGGGGG |
| 26 | AKT1 | TTAAATTAAAACCCGCAGGGGGATTGAGTTTTG<br>AACTCCCTGCGGCTTTTAATTTAG |
| 27 | CDC42 | TACTTGACAGCCTTCAGGTGGGATTGAGTTTTG<br>AACTCACCTGAACGCTGTCAAGTG |
| 28 | CTNNB1 | TTCGAATCAATCCAACAGTGGGATTGAGTTTTG<br>AACTCACTGTTGCATTGATTCGAG |
| 29 | RAC1 | TATATTCTCCAGGAAATGCGGGATTGAGTTTTG<br>AACTCGCATTTCGTGGAGAATATG |
| 30 | TRIM28 | TAAAACTCACACTGGTTGCGGGATTGAGTTTTG<br>AACTCGCAACCACTGTGAGTTTTG |

The artificial miRNA-based shRNAs of Table II were combined into vectors that contain multiplexed microRNA-based shRNA as shown in Table III.

TABLE III

| Vector | shRNA1 | Linker | shRNA2 | Linker | shRNA3 | Linker | shRNA4 | 5' flanking sequence | 3' flanking sequence |
|---|---|---|---|---|---|---|---|---|---|
| SV01 | PPIB | 9 | ILK | 10 | CDK5 | 11 | AKT1 | 17 | 20 |
| SV02 | PPIB | 9 | ILK | 10 | CDK5 | 11 | AKT1 | 18 | 21 |
| SV03 | PPIB | 9 | ILK | 10 | CDK5 | 11 | AKT1 | 19 | 22 |
| SV04 | PPIB | 9 | ILK | 10 | CDK5 | 11 | AKT1 | 17 | 20 |
| SV05 | PPIB | 9 | ILK | 10 | CDK5 | 11 | AKT1 | 18 | 21 |
| SV06 | PPIB | 9 | ILK | 10 | CDK5 | 11 | AKT1 | 19 | 22 |
| SV07 | PPIB | — | ILK | — | CDK5 | — | AKT1 | 17 | 20 |
| SV08 | PPIB | 13 | ILK | 14 | CDK5 | 15 | AKT1 | 17 | 20 |
| SV09 | PPIB | 13 | ILK | 14 | CDK5 | 15 | AKT1 | 17 | 20 |
| SV10 | PPIB | 13 | ILK | 14 | CDK5 | 15 | AKT1 | 17 | 20 |
| SV11 | AKT1 | 9 | CDK5 | 10 | ILK | 11 | PPIB | 17 | 20 |
| SV12 | AKT1 | 13 | CDK5 | 14 | ILK | 15 | PPIB | 17 | 20 |
| SV13 | AKT1 | 1 | CDK5 | 2 | ILK | 3 | PPIB | 17 | 20 |
| SV14 | AKT1 | 4 | CDK5 | 5 | ILK | 6 | PPIB | 17 | 20 |
| SV15 | AKT1 | 1 | CDK5 | 2 | ILK | 3 | PPIB | 17 | 20 |
| SV16 | PPIB | — | ILK | — | CDK5 | — | — | 17 | 20 |
| SV17 | PPIB | 13 | ILK | 14 | CDK5 | 15 | — | 17 | 20 |
| SV18 | PPIB | 13 | ILK | 14 | — | 15 | AKT1 | 17 | 20 |
| SV-PA | PPIB | | | | | | AKT1 | 17 | 20 |
| SV-AP | PPIB | | | | | | AKT1 | 17 | 20 |
| SV19 | CDC42 | 9 | CTTNB1 | 10 | RAC1 | 11 | TRIM28 | 19 | 22 |
| SV20 | RAC1 | 9 | TRIM28 | 10 | CDC42 | 11 | CTTNB1 | 19 | 22 |
| SV21 | TRIM28 | 9 | CDC42 | 10 | CTTNB1 | 11 | RAC1 | 19 | 22 |
| SV22 | CDC42 | 13 | CTTNB1 | 14 | RAC1 | 15 | TRIM28 | 19 | 22 |
| SV23 | RAC1 | 13 | TRIM28 | 14 | CDC42 | 15 | CTTNB1 | 19 | 22 |
| SV24 | TRIM28 | 13 | CDC42 | 14 | CTTNB1 | 15 | RAC1 | 19 | 22 |

*In Table III, the linker number identifies the Sequence ID NO: of the sequence from Table I; the 5' and 3' flanking sequence numbers identify the combination of Sequence ID NO used in each vector.

Example 2: Scaffolds

A comparison of functionality and off-target effects was undertaken using vectors that each contained a single scaffold with mature (active) and guide (passenger) sequences. The scaffolds were: miR-196a-2, miR-30a, miR-26b, miR-196a-2, miR-204, and miR-126. As a control, measurements were also taken for a vector that didn't contain miRNA sequences.

Endogenous microRNAs, including 200-300 bp flanking the stem-loop region, were PCR amplified from genomic DNA isolated from HeLa cells. microRNAs were cloned into a vector for co-expression of the microRNA and GFP under a CMV promoter and sequence verification. HeLa cells were plated at 10,000 cells/well in 96-well format one day prior to transfection. microRNA-expressing plasmids (60 ng) were co-transfected with a dual luciferase reporter plasmid [psiCheck2 (Promega); 40 ng] containing the active strand-targeting sequence or the passenger strand-targeting sequence in the 3' UTR of Renilla luciferase. Data were normalized to the cloning vector without a microRNA insert (vector only) co-transfected with a psiCheck2 plasmid with the respective targeting sequence, and further normalized to the Firefly luciferase expression to calculate knockdown efficiency.

Figure 3:
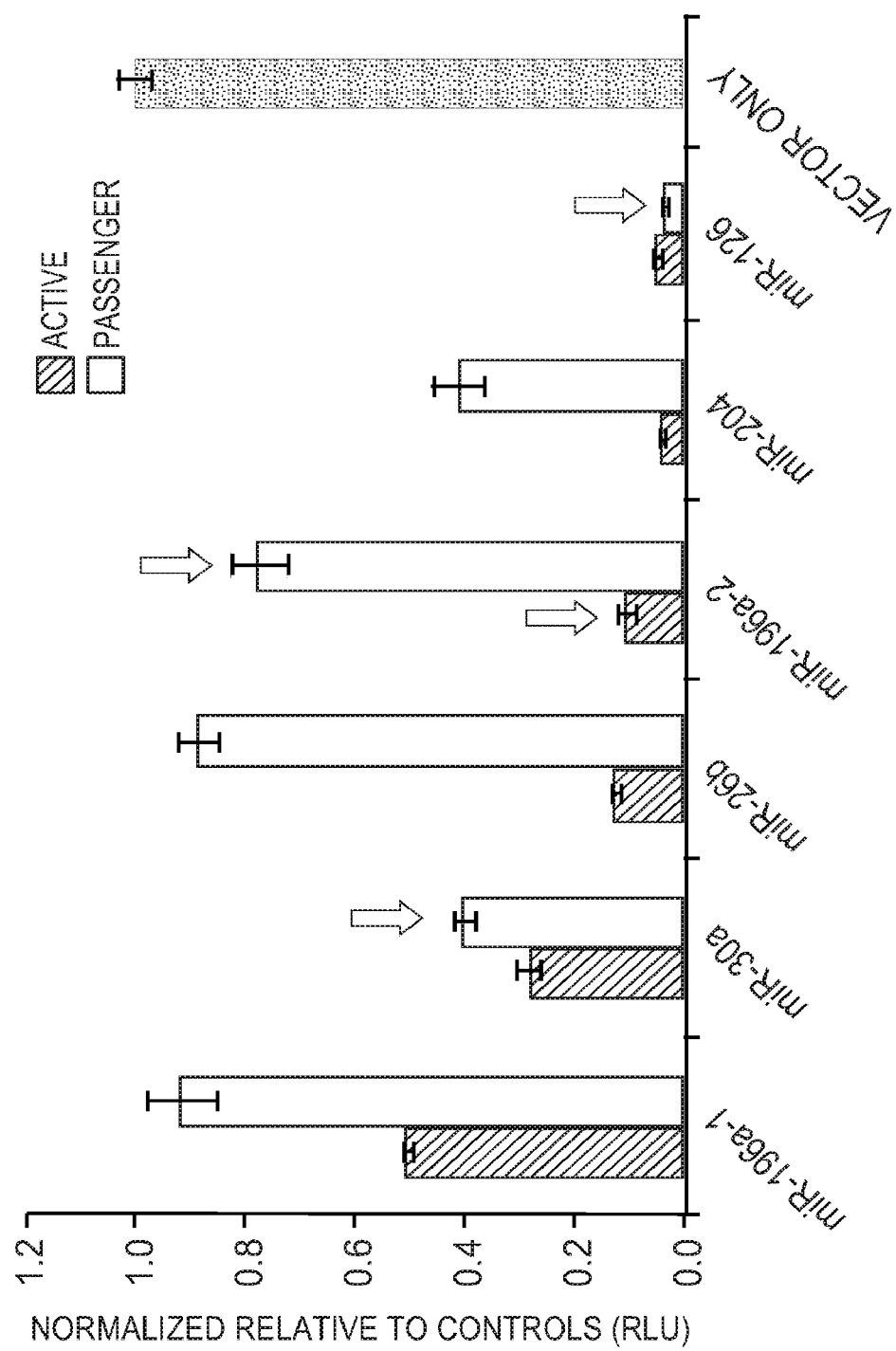
FIG. 3 is a bar graph showing silencing by active and passenger strands of miRNAs with six different scaffolds.

As the data in FIG. 3 show, the active strand of each of the vectors causes at least 50% silencing for miR-196-1, miR-30a, miR-26b, miR-196a-2, miR-204 and miR-126. The passenger strands of the vectors show varying degrees of silencing. The greatest differentials between active and passenger strands are within miR-26b, miR-196a-2, and miR-204.

Example 3: Gene Knockdown with Multiplexed Vectors Directed to PPIB, ILK, CDK5, and AKT1

Multiplexed microRNA-based shRNA vectors were transduced into U2OS cells and gene knockdowns were analyzed by RT-qPCR. The shRNAs encoded in the multiplexes were designed to target PPIB, ILK, CDK5, and AKT1. (See Seq ID NO: 23-26 of Table II and SV01-SV15 of Table III.)

Figure 4:
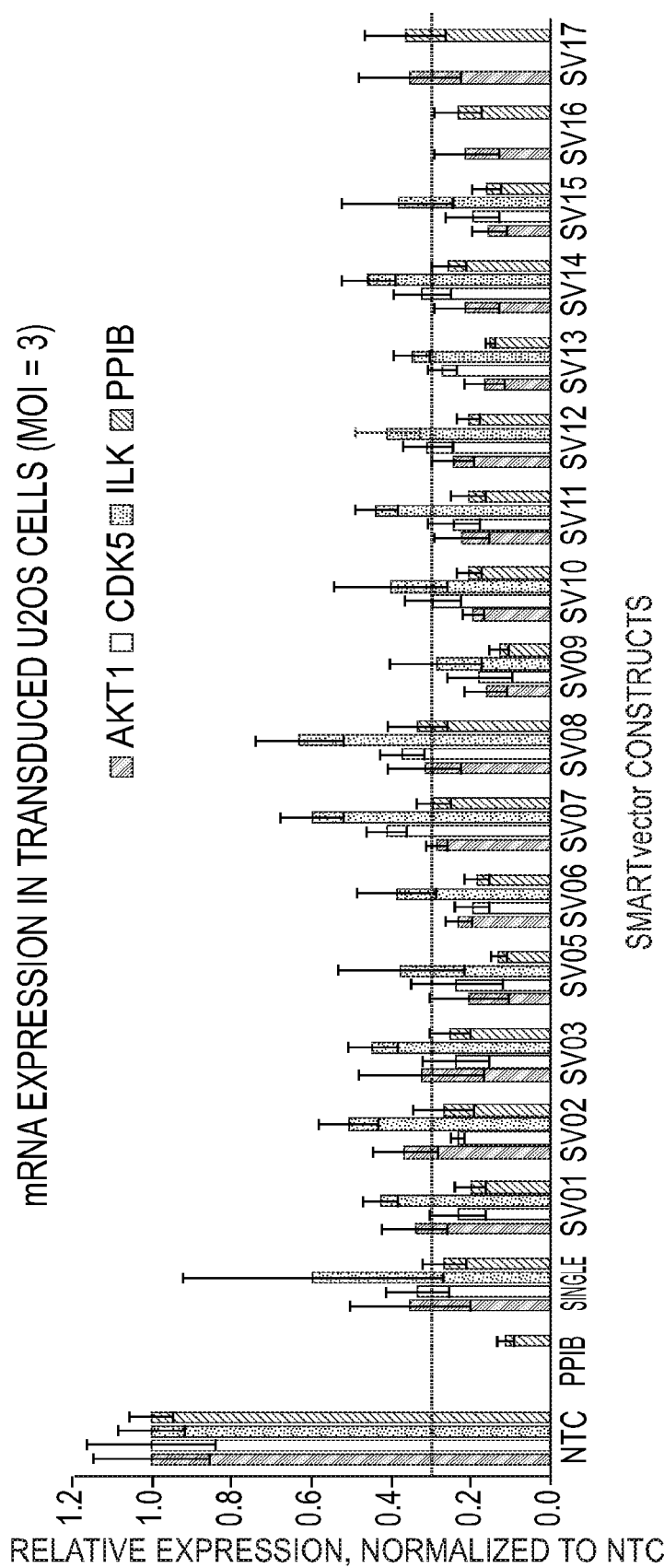
FIG. 4 is a bar graph showing levels of mRNA expression in U2OS cells transduced with lentiviral particles expressing multiplexed microRNA-based shRNAs (MOI=1) for the targets AKT1, CDK5, ILK, and PPIB.

FIG. 4 provides the mRNA expression (Multiplicity of Infection (MOI)=3). These results show that nearly all multiplexed microRNA-based shRNA design achieved ≥70% knock-down in U2OS cells. Additionally, these results show that the position of the shRNA in the cassette did not affect functionality and that there were no differences in silencing for the designs in which two or four multiplexed microRNA-based shRNA were used.

Example 4: Gene Knockdown with Multiplexed Vectors Directed to CDC42, CTTNB1, RAC1, and TRIM28

Multiplexed microRNA-based shRNA vectors were transduced into U2OS cells and gene knockdowns were analyzed by RT-qPCR. The shRNAs encoded in the multiplexes were designed to target CDC42, CTTNB1, RAC1, and TRIM28. Vectors were created using the linkers present in the vector designs SV03 (SV19, SV20, SV21) and SV09 (SV22, SV23, SV24). (See SEQ ID NO: 27-30 of Table II and SV19-SV24 of Table III.) Three vectors were created for each set of four gene targets by varying the position of the shRNA in the cassette. Single miRNA-based shRNAs were also tested.

Figure 5:
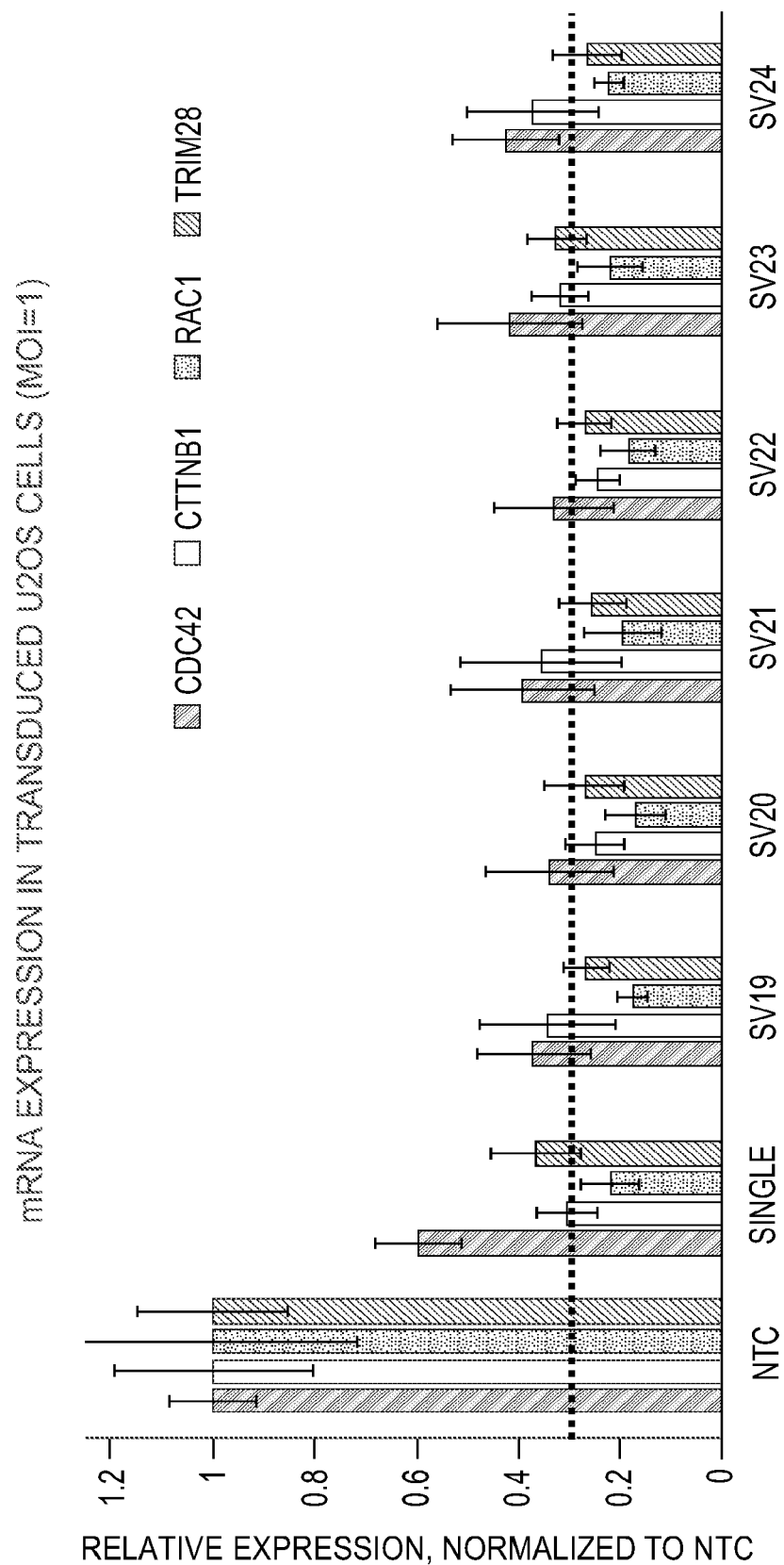
FIG. 5 is a bar graph showing levels of mRNA expression in U2OS cells transduced with lentiviral particles expressing multiplexed microRNA-based shRNAs (MOI=1) for the targets CDC42, CTTNB1, RAC1, and TRIM28.
Figure 6:
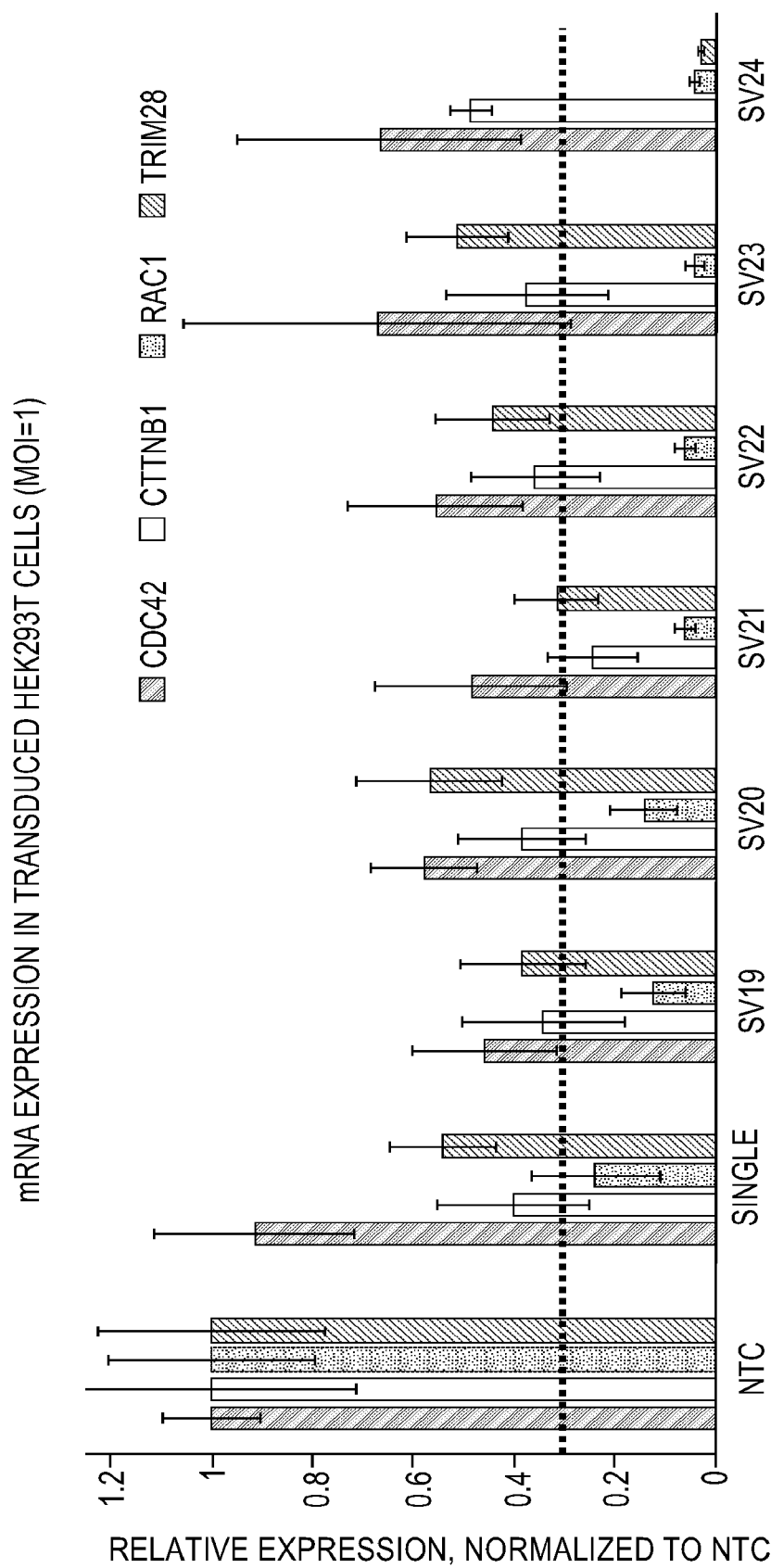
FIG. 6 is a bar graph showing levels of mRNA expression in HEK293T cells transduced with lentiviral particles expressing multiplexed microRNA-based shRNAs (MOI=1) for the targets CDC42, CTTNB1, RAC1, and TRIM28.

FIG. 5 provides the mRNA expression (Multiplicity of Infection (MOI)=1) for single, SV19, SV20, SV21, SV22, SV23, and SV24 (see Table III). FIG. 6 provides the mRNA expression in transduced HEK293T cells (Multiplicity of Infection (MOI)=1) for single, SV19, SV20, SV21, SV22, SV23, and SV24 (see Table III). These results show that all of the vectors effected efficient gene knockdown activity independently of the shRNA position in both cell lines. They also show the effectiveness of silencing when using the recited linkers, which were chosen based on their sequences.

Example 5: Multiplexes with Different Scaffolds

Figure 7:
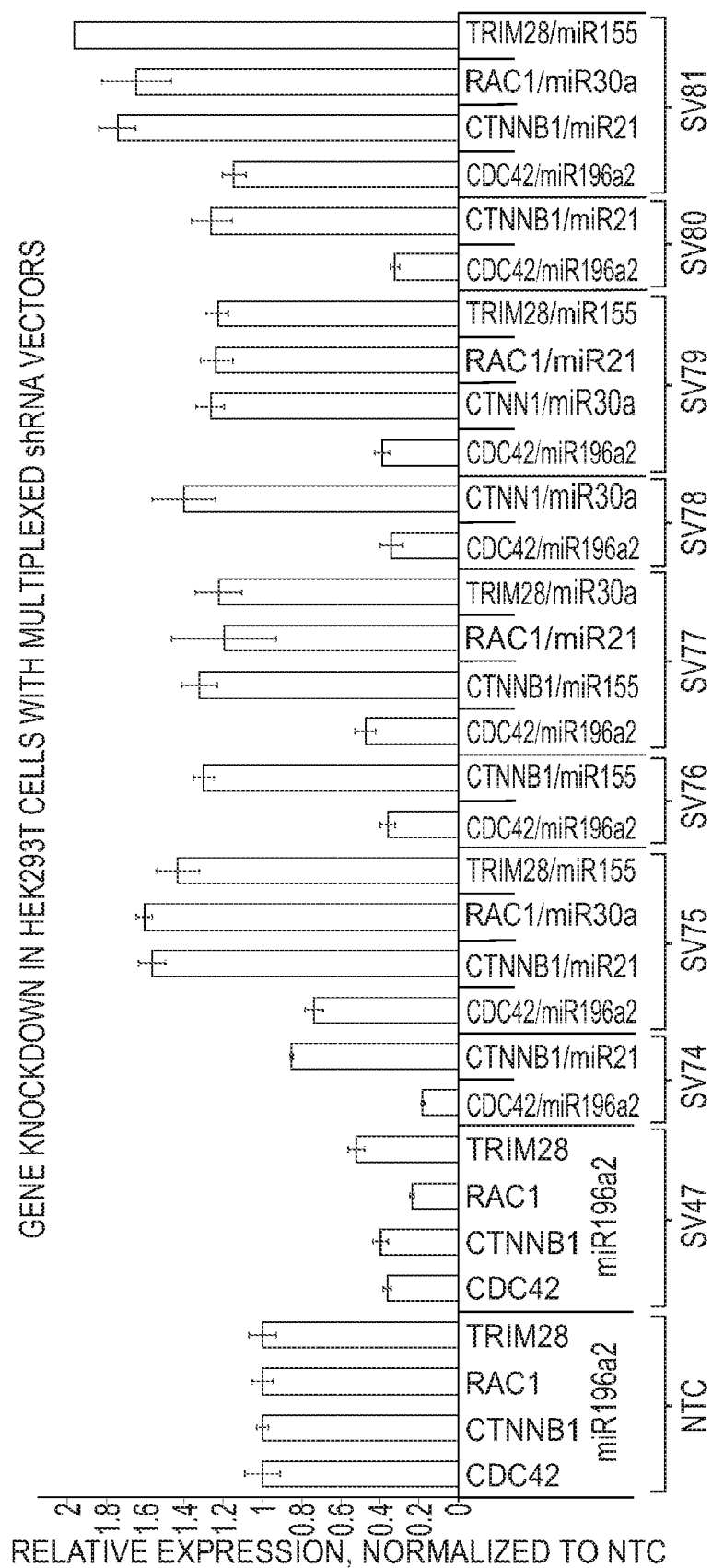
FIG. 7 is a bar graph showing levels of gene expression for CDC42, CTNNB1, RAC1, and TRIM28 in different multiplexed microRNA-based shRNAs in HEK293T cells.

Multiplexed microRNA that contained active sequences that target CDC42, CTNNB1, RAC1, and TRIM28 were transduced into HEK293T cells. In multiplex SV47, all scaffolds were miR196a-2 (Table IV). In all of the other multiplexes, there were two or more different scaffolds (Table V). Except for vector SV81, within each vector, between scaffolds, linkers of 6-14 nucleotides in length were present. In SV81, no linkers were present. The results are shown in FIG. 7. As the figure shows, the vectors with exclusively miR-196a-2 scaffolds consistently performed better than all other scaffolds, and only in SV47, where all scaffolds were miR-196a-2 was there gene suppression for all four targets. Additionally, the absence of linkers was problematic when the vector contained different scaffolds.

TABLE IV

| Sequence ID No: | Target gene | Sequence |
|---|---|---|
| 33 | PRKDC | TCCAGGTTAATGAAAGCCGGGGATTGAGTTTTG AACTCCGGCTTTGATTAACCTGGG |
| 34 | CHUK | TAAACCGAACTTCTCCTGAGGGATTGAGTTTTG AACTCTCAGGAGTAGTTCGGTTTG |
| 35 | RPS 6K53 | TCGACGATTAACTACTTCTGGGATTGAGTTTTGA ACTCAGAAGTACTTAATCGTCGG |
| 36 | HIF1A | TATGGGTTCACAAATCAGCGGGATTGAGTTTTG AACTCGTTGATTAGTGAACTCATG |

TABLE V

| Sequence ID No: | Target gene/miRNA scaffold | Sequence |
|---|---|---|
| 37 | CTNNB1/ miR-21 | TGTCGGGTTCGAATCAATCCAACAGTT GACTGTTGAATCTCATGGCACTGTTGC ATTGATTCGAGTCTGACA |
| 38 | RAC1/miR-30a | GCGACTATATTCTCCAGGAAATGCAA GCTGTGAAGCCACAGATGGGCGCATT TCGTGGAGAATATAGCTGC |
| 39 | TRIM28/ miR-155 | CTGTAAAACTCACACTGGTTGCGGGTT TTTGCCTCCAACTGACGCAACCACTGT GAGTTTTACAG |
| 40 | CTNNB1/ miR-155 | CTGTTCGAATCAATCCAACAGTGGGTT TTTGCCTCCAACTGACACTGTTGCATT GATTCGAACAG |
| 41 | RAC1/miR-21 | TGTCGGGTATATTCTCCAGGAAATGCT GACTGTTGAATCTCATGGCGCATTTCG TGGAGAATATGTCTGACA |
| 42 | TRIM28/ miR-30a | GCGACTAAAACTCACACTGGTTGCAA GCTGTGAAGCCACAGATGGGCGCAAC CACTGTGAGTTTTAGCTGC |
| 43 | CTNNB1/ miR-30a | GCGACTTCGAATCAATCCAACAGTAA GCTGTGAAGCCACAGATGGGCACTGT TGCATTGATTCGAAGCTGC |
| 44 | TRIM28/ miR-21 | TGTCGGGTAAAACTCACACTGGTTGCT GACTGTTGAATCTCATGGCGCAACCA CTGTGAGTTTTGTCTGACA |
| 45 | RAC1/miR-155 | CTGTATATTCTCCAGGAAATGCGGGTT TTTGCCTCCAACTGACGCATTTCGTGG AGAATATACAG |

Example 6: Number of Scaffolds in Multiplexes

Figure 8A:
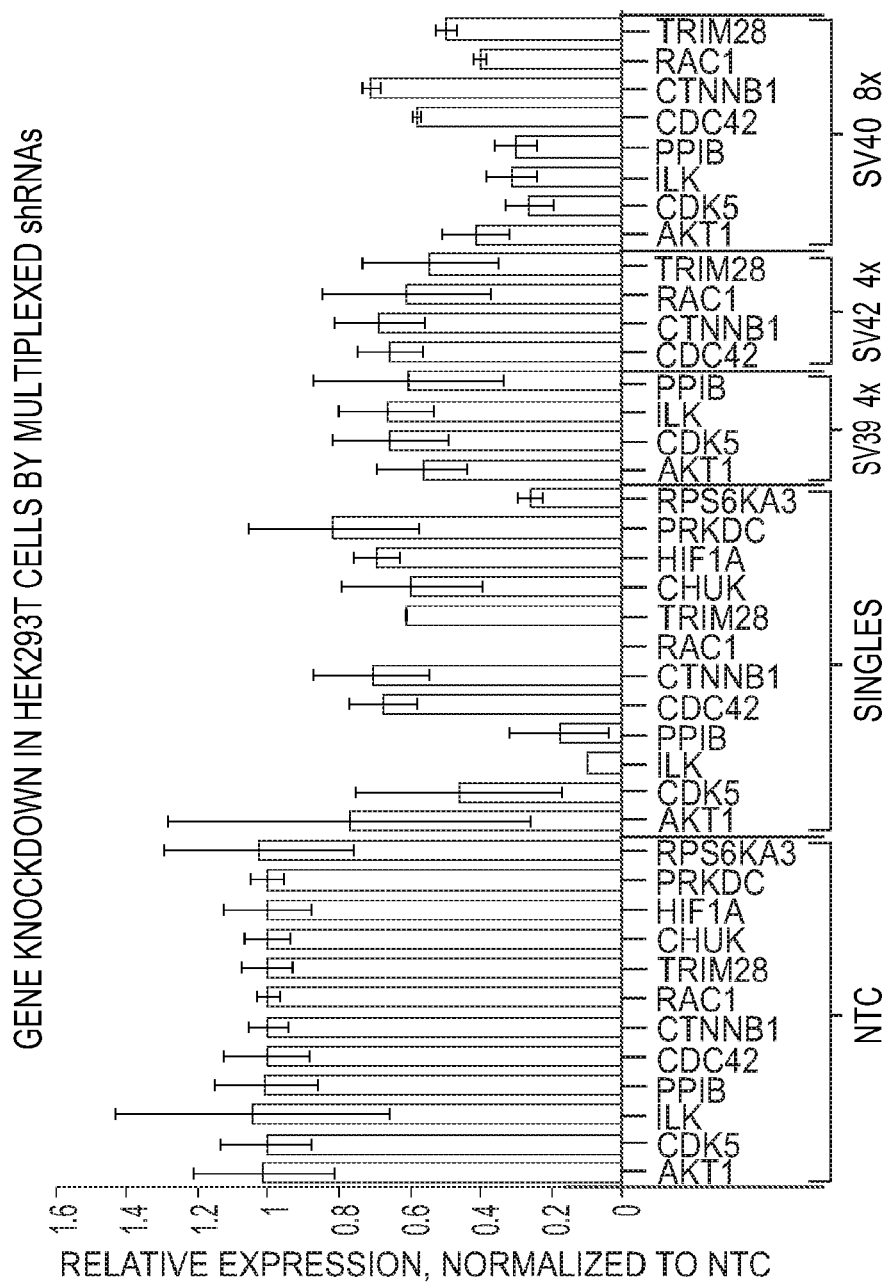
FIGS. 8A and 8B are bar graphs showing levels of gene expression when multiplexes of up to twelve microRNA-based shRNAs are used in HEK293T cells.
Figure 8B:
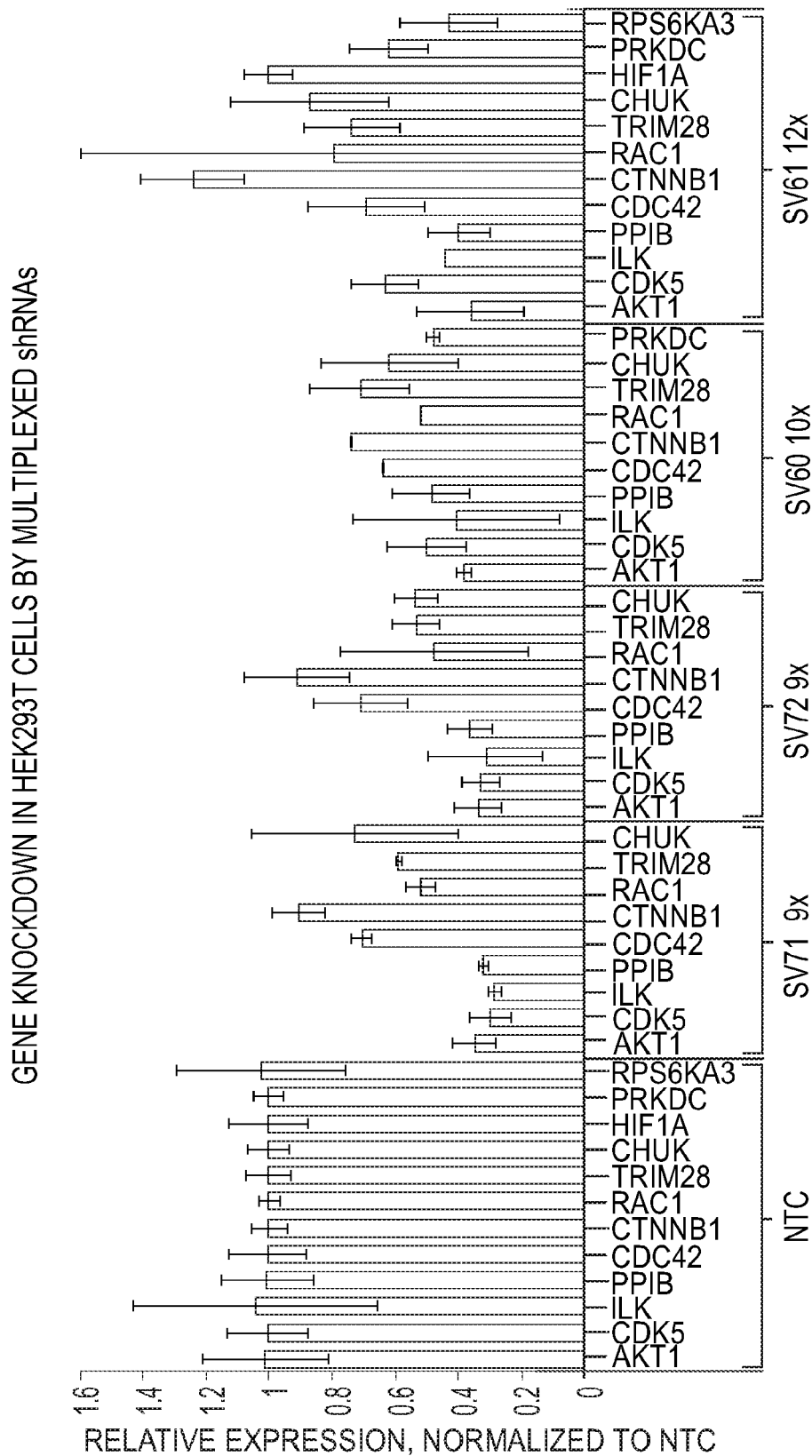

Multiplexed microRNA that contained four to twelve consecutive miR-196a-2 scaffolds were created. Each scaffold contained an active sequence that targeted one of AKT1, CDK5, ILK, PPIB, CDC42, CTNNB1, RAC1, TRIM28, CHUK, HIF1A, PRKDC, and RPS6KA3. The multiplexes were transduced into HEK293T cells. As FIGS. 8A and 8B show transduction of multiplexes with pluralities of miR-196a-2 scaffolds consistently showed gene suppression.

Example 7: Multiplex in T Cells

Figure 9:
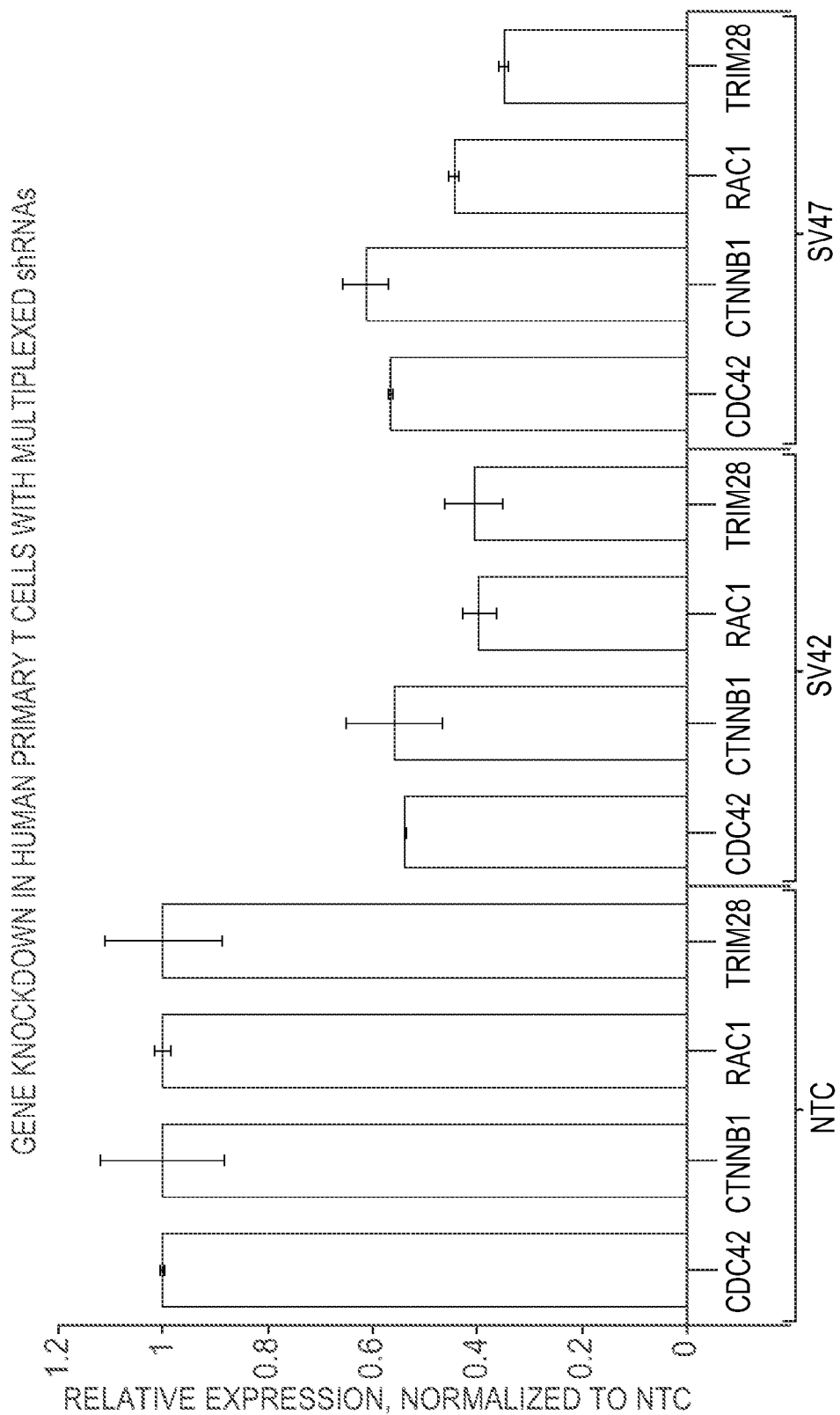
FIG. 9 is a bar graph showing levels of gene expression when multiplexes with miR-196a-2 are transduced into human primary T cells.

Multiplexed microRNA-based shRNAs that contained four consecutive miR-196a-2 scaffolds were created. Each scaffold contained an active sequence that targeted one of CDC42, CTNNB1, RAC1, and TRIM28. The multiplexes were transduced into human primary T cells. As FIG. 9 shows, transduction of multiplexes with pluralities of miR-196a-2 scaffolds showed effective reduction of expression of all four genes as compared to the control (NTC).

Example 8: Absence of Linkers and Short Linkers

Figure 10:
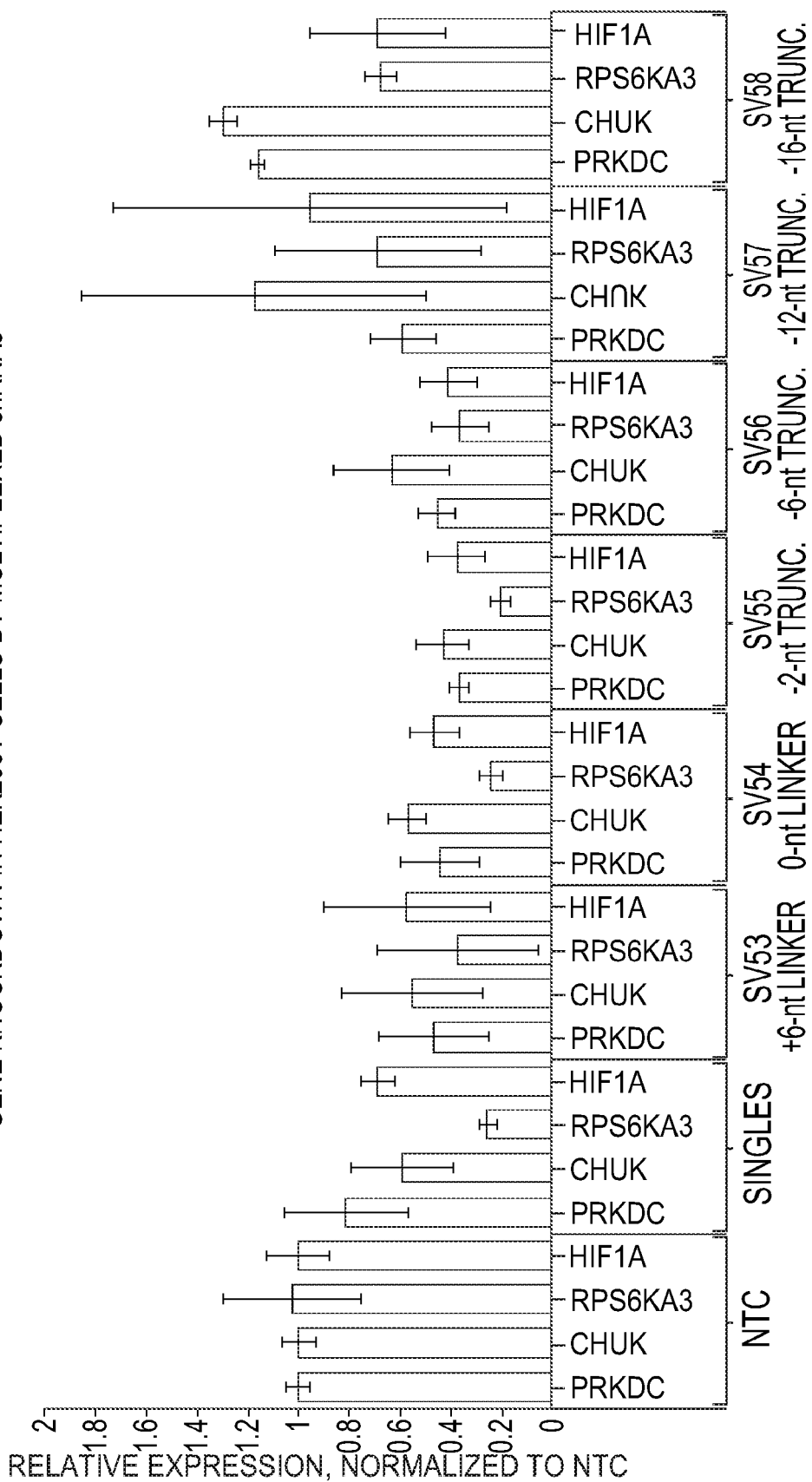
FIG. 10 is a bar graph showing levels of gene expression when multiplexes with miR-196a-2 are transduced into HEK293T cells and there are linkers of various lengths, no linkers, or truncations.

Additional shRNA multiplexes were created with four miR-196a-2 scaffolds that housed active sequences for PRKDC, CHUK, RPS6KA3 and HIF1A. These multiplexes were created to evaluate the gene knockdown performance with shorter to no linkers. The results show that shorter linkers or an absence of linkers performed similarly if not better than longer linkers when using the miR-196a-2 scaffolds. (See FIG. 10.)

The additional shRNA multiplexed constructs were created with linkers or truncations of the miR-196a-2 scaffold as described below:

SV53: 6 nucleotide long linkers
SV54: no linkers
SV55: truncation of 2 nucleotides (1 nucleotide from each of the 5' and 3' ends)
SV56: truncation of 6 nucleotides (3 nucleotides from each of the 5' and 3' ends)
SV57: truncation of 12 nucleotides (6 nucleotides from each of the 5' and 3' ends)
SV58: truncation of 16 nucleotides (8 nucleotides from each of the 5' and 3' ends)

For both SV53 (6 nucleotide long linkers) and SV54 (no linkers), there was effective silencing of all four genes. Each gene was silenced to an expression level of below 60% relative to the control, which reflected normal gene expression.

For SV55 (2 nucleotides truncation) there was gene silencing of each of the four targets to a level of expression between 20% and 45% of the control. For SV56 (6 nucleotides truncation), gene expression of each of the four targets was knocked down to a level of between 35% and 65% of the control.

By contrast, for SV57 (12 nucleotide truncation) only one of the targets (PRKDC) was silenced to a level of below 60% and for SV58 (16 nucleotide truncation) none of the targets were silenced to a level below 60% of control.

Thus, the miR-196a-2 scaffold can tolerate truncations fewer than 6 nucleotides from each of its 5' and/or 3' ends without affecting the multiplex functionality and the expression of all four genes were reduced to less than 60% relative to the control (NTC). (See FIG. 10.)

The invention claimed is:

1. A polynucleotide comprising a multiplexed microRNA-based shRNA encoding region, wherein said multiplexed microRNA-based shRNA encoding region comprises a sequence that encodes two or more artificial miRNA-based shRNA nucleotide sequences, wherein each artificial miRNA-based shRNA nucleotide sequence comprises:
   (A) a miRNA scaffold sequence, wherein the miRNA scaffold sequence is a miR-196a-2 scaffold sequence or a sequence that is at least 95% identical to a miR-196a-2 scaffold sequence or a truncated miR-196a-2 scaffold sequence, wherein the truncated miR-196a-2 scaffold sequence is an miR-196a-2 sequence that has a deletion of 1-6 nucleotides on either or both a 5' end or a 3'end of the miR-196a-2 scaffold sequence;
   (B) an active sequence, wherein the active sequence of each of the artificial miRNA-based shRNA nucleotide sequences is 18-40 nucleotides long; and
   (C) a passenger sequence, wherein within each artificial miRNA-based shRNA nucleotide sequence, the active sequence is at least 80% complementary to the passenger sequence and each passenger sequence is 18-40 nucleotides long.

2. The polynucleotide of claim 1, wherein between each two of said artificial miRNA-based shRNA nucleotide sequences there is either no linker sequence or a linker sequence that is 1-60 nucleotides long.

3. The polynucleotide of claim 2, wherein there are no linker sequences between the artificial miRNA-based shRNA nucleotide sequences.

4. The polynucleotide of claim 2, wherein there are two to twelve artificial miRNA-based shRNA nucleotide sequences.

5. The polynucleotide of claim 4, wherein there are X artificial miRNA-based shRNA nucleotide sequences and Y linker sequences, wherein Y=X−1 and each linker sequence is located between two artificial miRNA-based shRNA nucleotide sequences.

6. The polynucleotide of claim 5, wherein X=2 to 10.

7. The polynucleotide of claim 1 further comprising a 3' flanking sequence, wherein the 3' flanking sequence is located downstream of the miRNA-based shRNA encoding region and a 5' flanking sequence, wherein the 5' flanking sequence is located upstream of the miRNA-based shRNA encoding region.

8. The polynucleotide of claim 7, wherein:
   (A) the 5' flanking sequence is 1 to 180 nucleotides long; and
   (B) the 3' flanking sequence is 1 to 180 nucleotides long.

9. The polynucleotide of claim 1, wherein each active sequence is different.

10. The polynucleotide of claim 1, wherein in each artificial miRNA-based shRNA nucleotide sequence, the miRNA scaffold sequence comprises SEQ ID NO: 31 or a sequence that is at least 95% identical to SEQ ID NO: 31 or a truncated SEQ ID NO: 31 sequence, wherein the truncated SEQ ID NO: 31 sequence has a deletion of 1-6 nucleotides on either or both a 5' end or a 3' end of the SEQ ID NO: 31 sequence.

11. The polynucleotide of claim 10, wherein each miRNA scaffold sequence comprises SEQ ID NO: 31.

12. The polynucleotide of claim 1, wherein there is at least one mismatch between the active sequence and the passenger sequence of at least one artificial miRNA-based shRNA nucleotide sequence.

13. An expression vector comprising the polynucleotide of claim 1 further comprising a promoter sequence.

14. The expression vector of claim 13, wherein each artificial miRNA-based shRNA nucleotide sequence encoded within the expression vector is capable of forming a stem and loop structure.

15. The expression vector of claim 14, wherein the expression vector is a eukaryotic expression plasmid or a mini-circle DNA.

16. A method of suppressing a plurality of genes, said method comprising introducing an expression vector of claim 15 into a cell in vitro.

17. The expression vector of claim 14, wherein the expression vector is a viral vector.

18. The expression vector of claim 17, wherein the viral vector is selected from the group consisting of a lentivirus, a retrovirus, an adenovirus, an adeno-associated virus, a coronavirus, and a Sendai virus.

19. A method of suppressing a plurality of genes, said method comprising introducing an expression vector of claim 14 into a cell in vitro.

20. A method of suppressing a plurality of genes, said method comprising introducing an expression vector of claim 13 into a cell in vitro.

* * * * *